Sept. 22, 1953
A. R. WILLARD ET AL
2,652,933
ASSEMBLING APPARATUS
Filed May 18, 1948
10 Sheets-Sheet 1

INVENTOR.
Alfred R. Willard
Carl R. Glasener
BY Fred C. Haak Jr. and
Charles A. Young
Kwis, Hudson, Boughton & Williams
ATTORNEYS

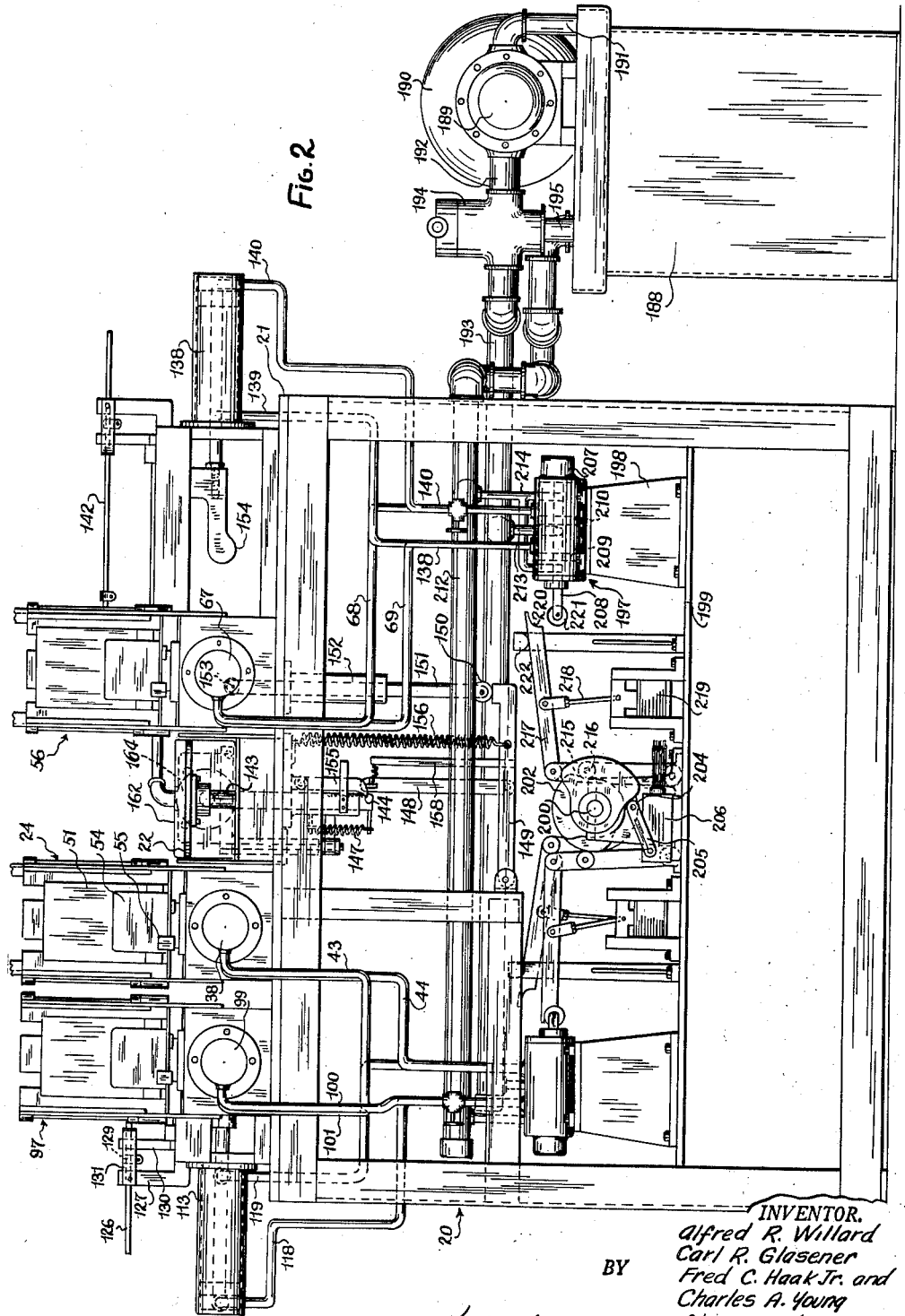

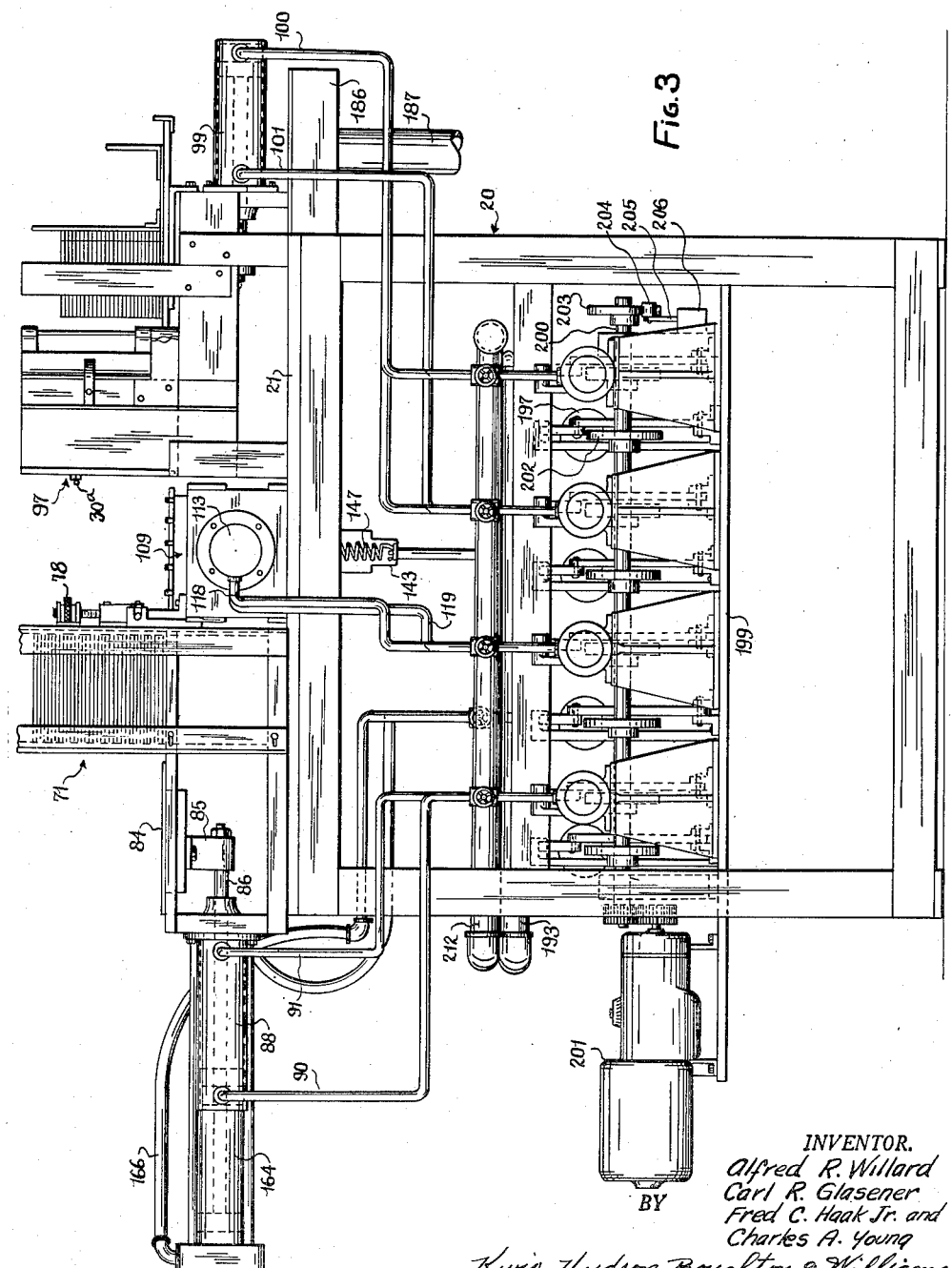

Sept. 22, 1953     A. R. WILLARD ET AL     2,652,933
ASSEMBLING APPARATUS
Filed May 18, 1948     10 Sheets-Sheet 4
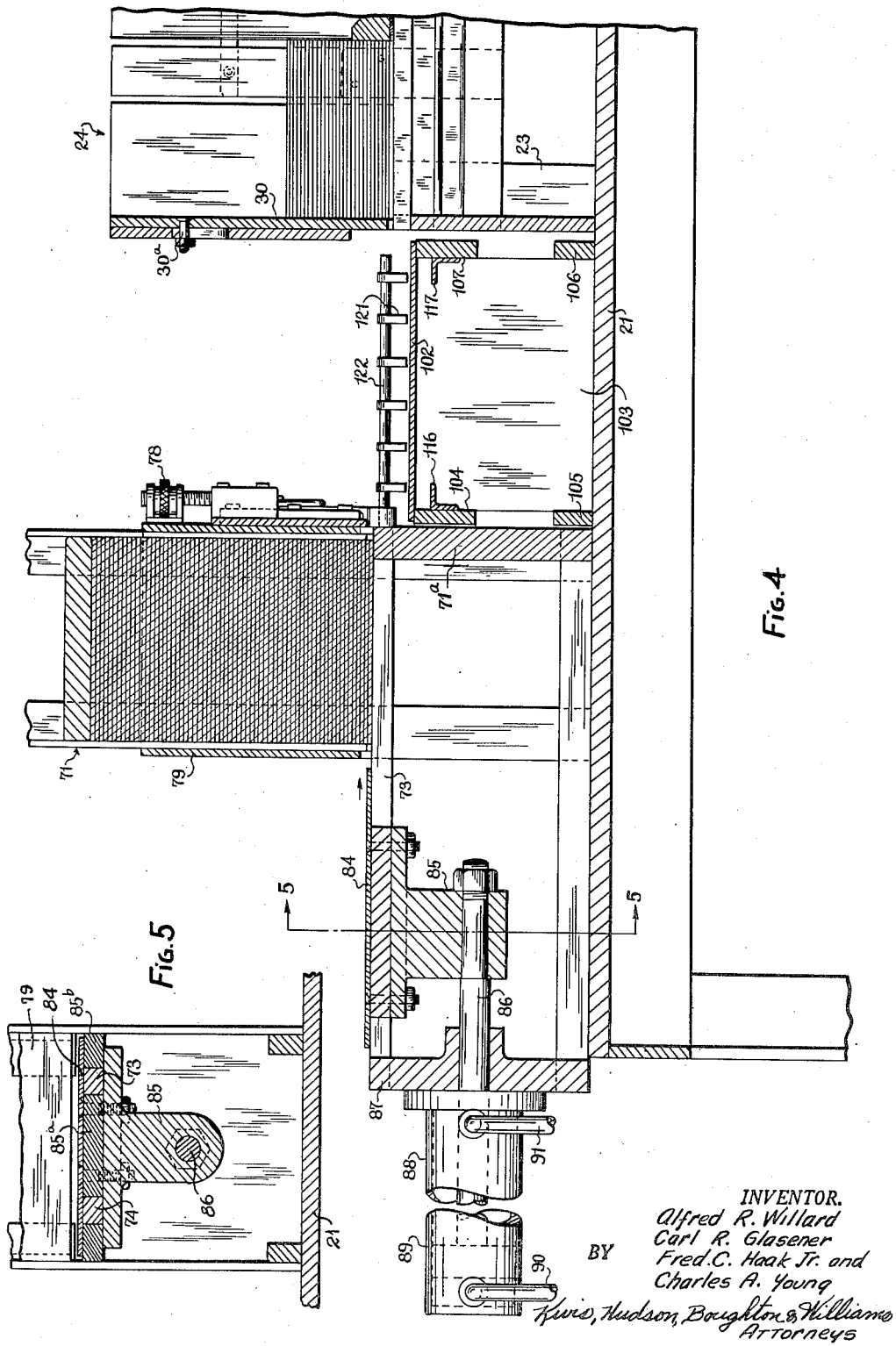
INVENTOR.
Alfred R. Willard
Carl R. Glasener
Fred C. Haak Jr. and
Charles A. Young
BY Kwis, Hudson, Boughton & Williams
Attorneys Sept. 22, 1953  A. R. WILLARD ET AL  2,652,933
ASSEMBLING APPARATUS
Filed May 18, 1948  10 Sheets-Sheet 5
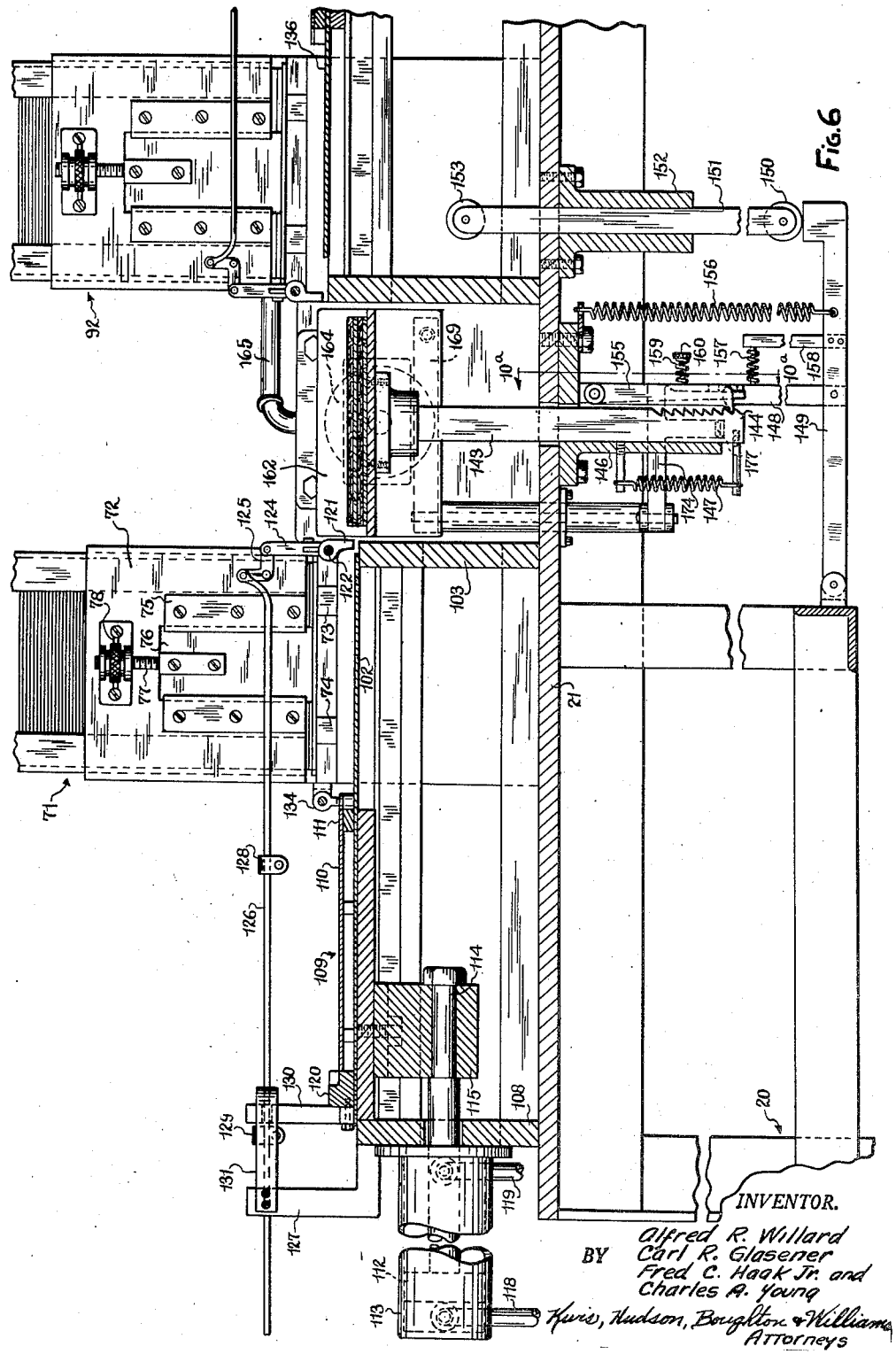
INVENTOR.
Alfred R. Willard
BY Carl R. Glasener
Fred C. Haak Jr. and
Charles A. Young
Kwis, Hudson, Boughton & Williams
Attorneys

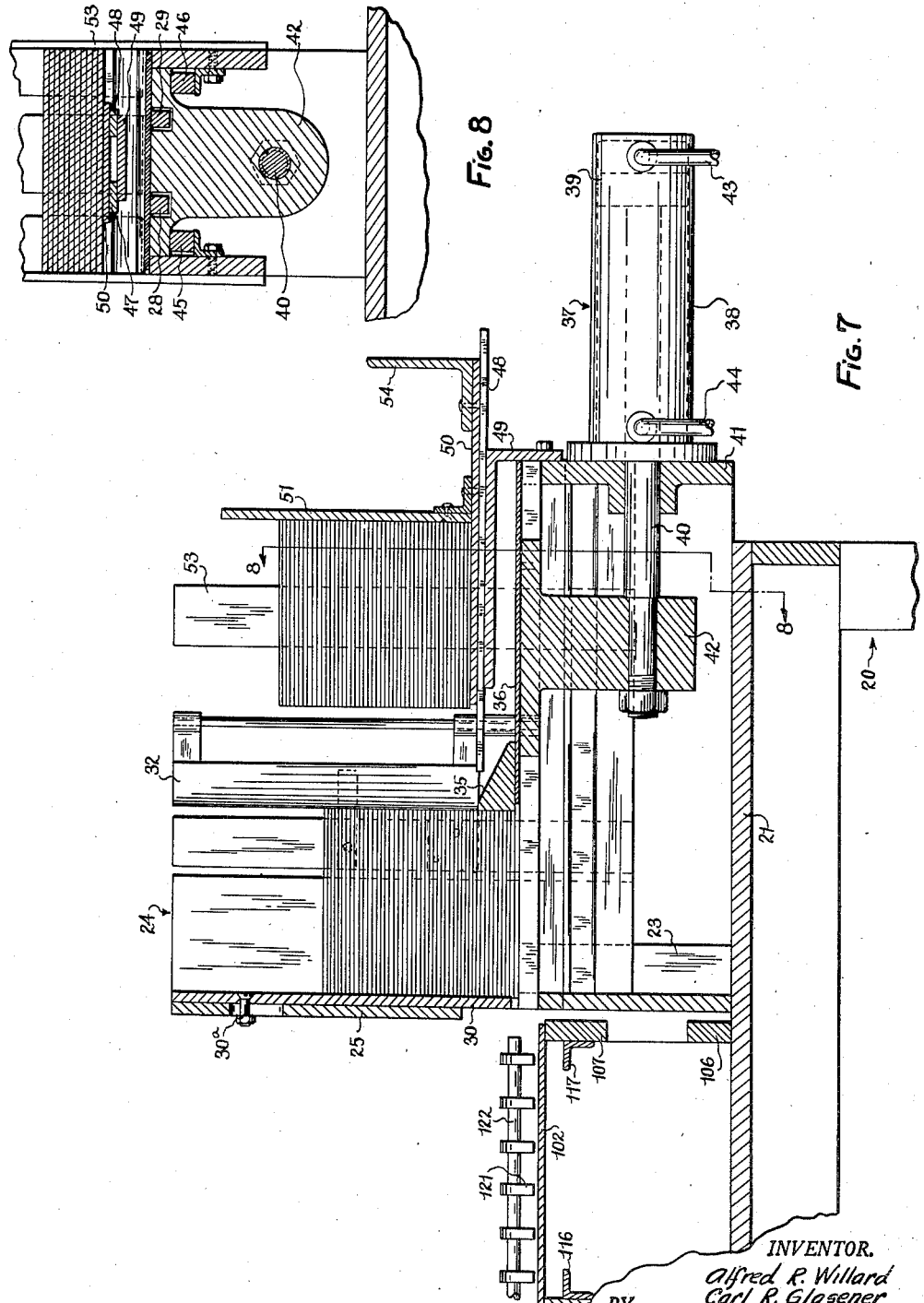

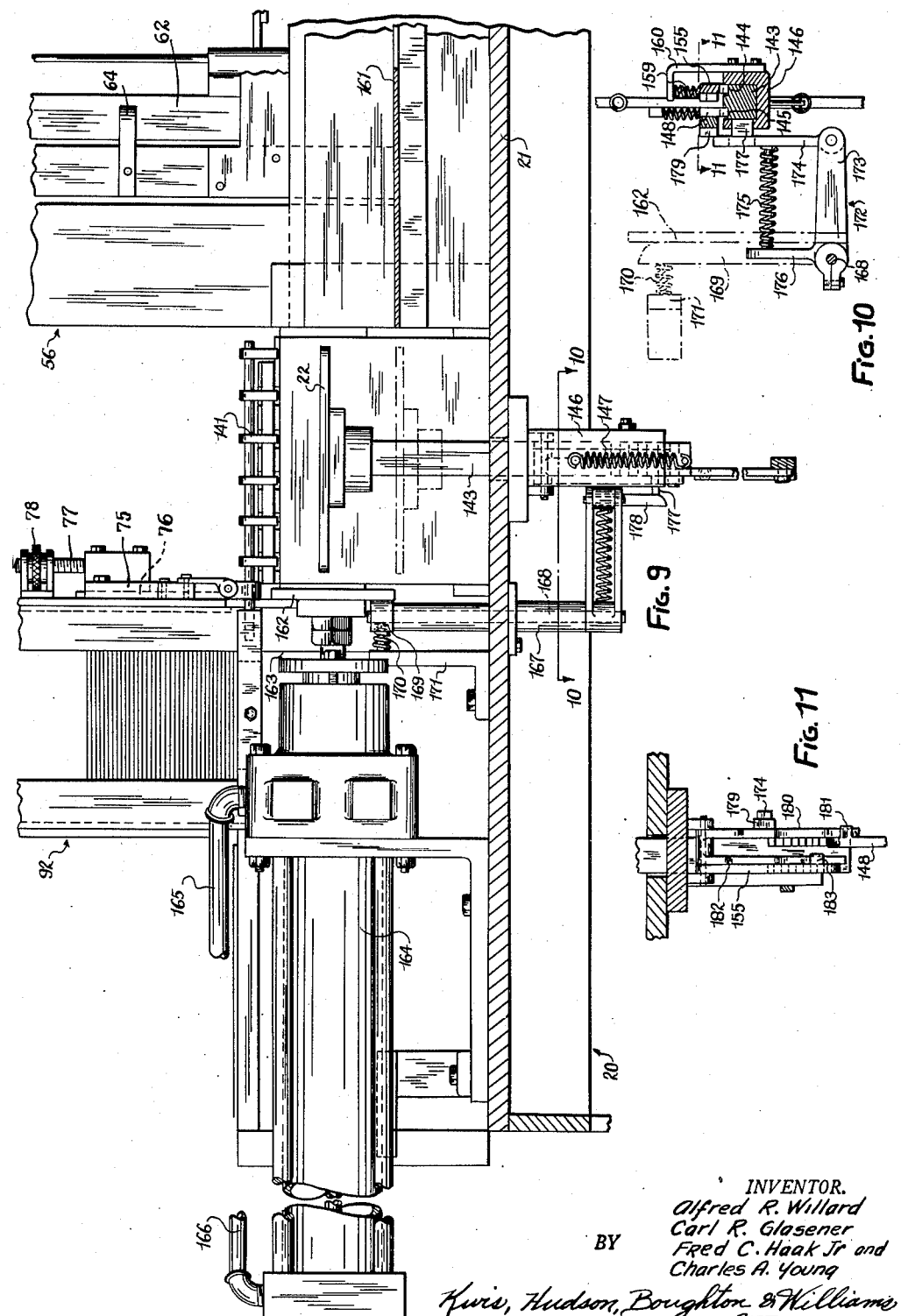

Sept. 22, 1953 A. R. WILLARD ET AL 2,652,933
ASSEMBLING APPARATUS
Filed May 18, 1948 10 Sheets-Sheet 8
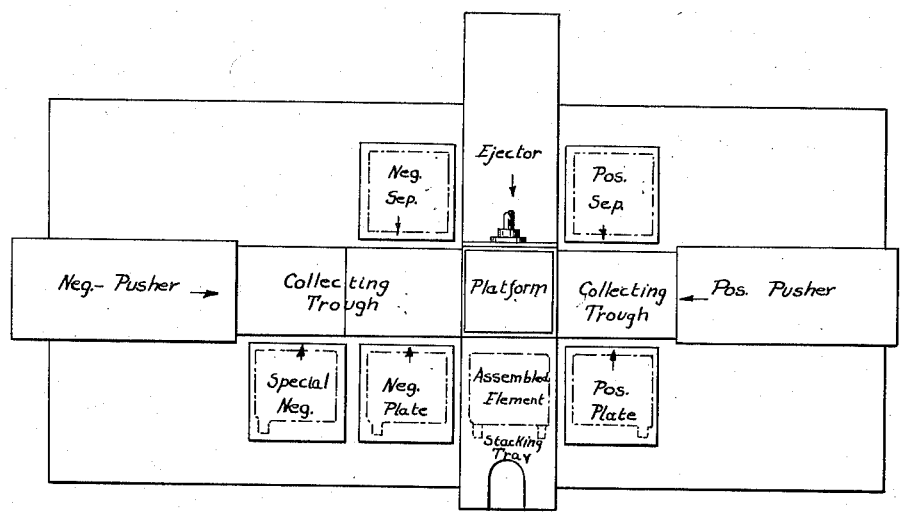
Fig. 12
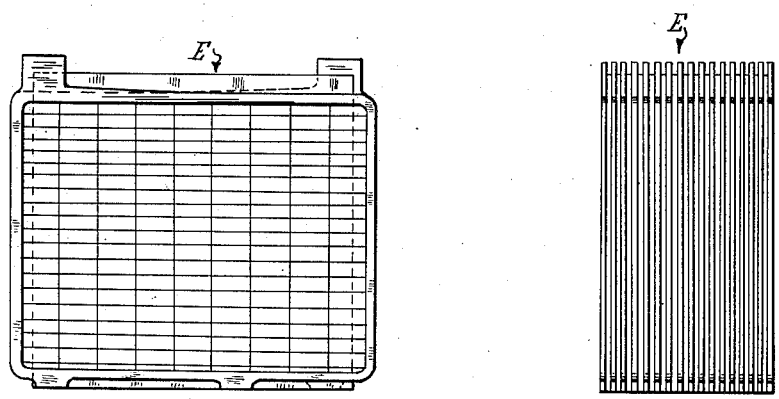
Fig. 13 Fig. 14
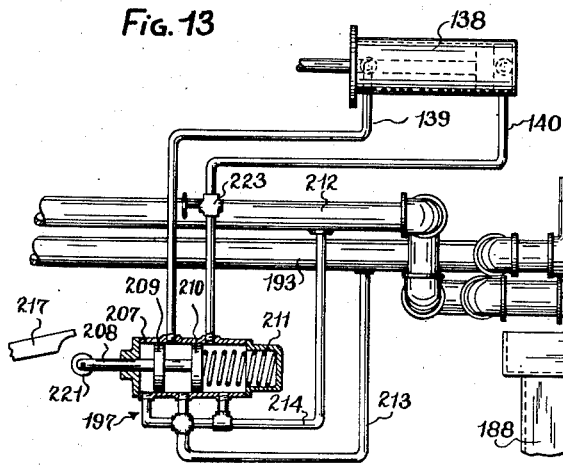
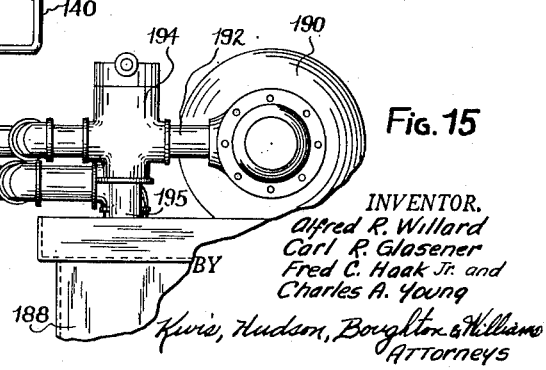
Fig. 15
INVENTOR.
Alfred R. Willard
Carl R. Glasener
Fred C. Hoak Jr. and
Charles A. Young
BY Kwis, Hudson, Boughton & Williams
ATTORNEYS

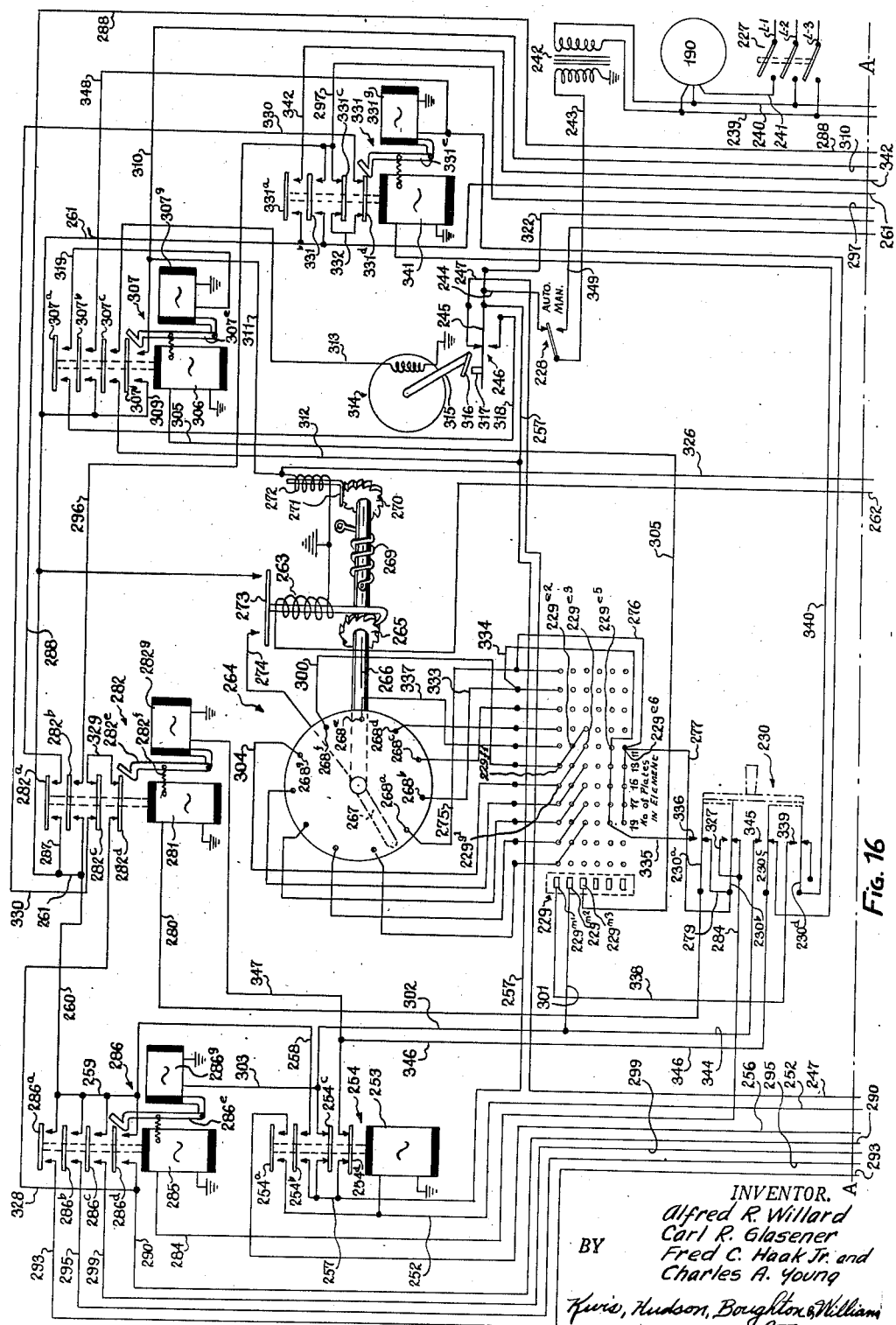

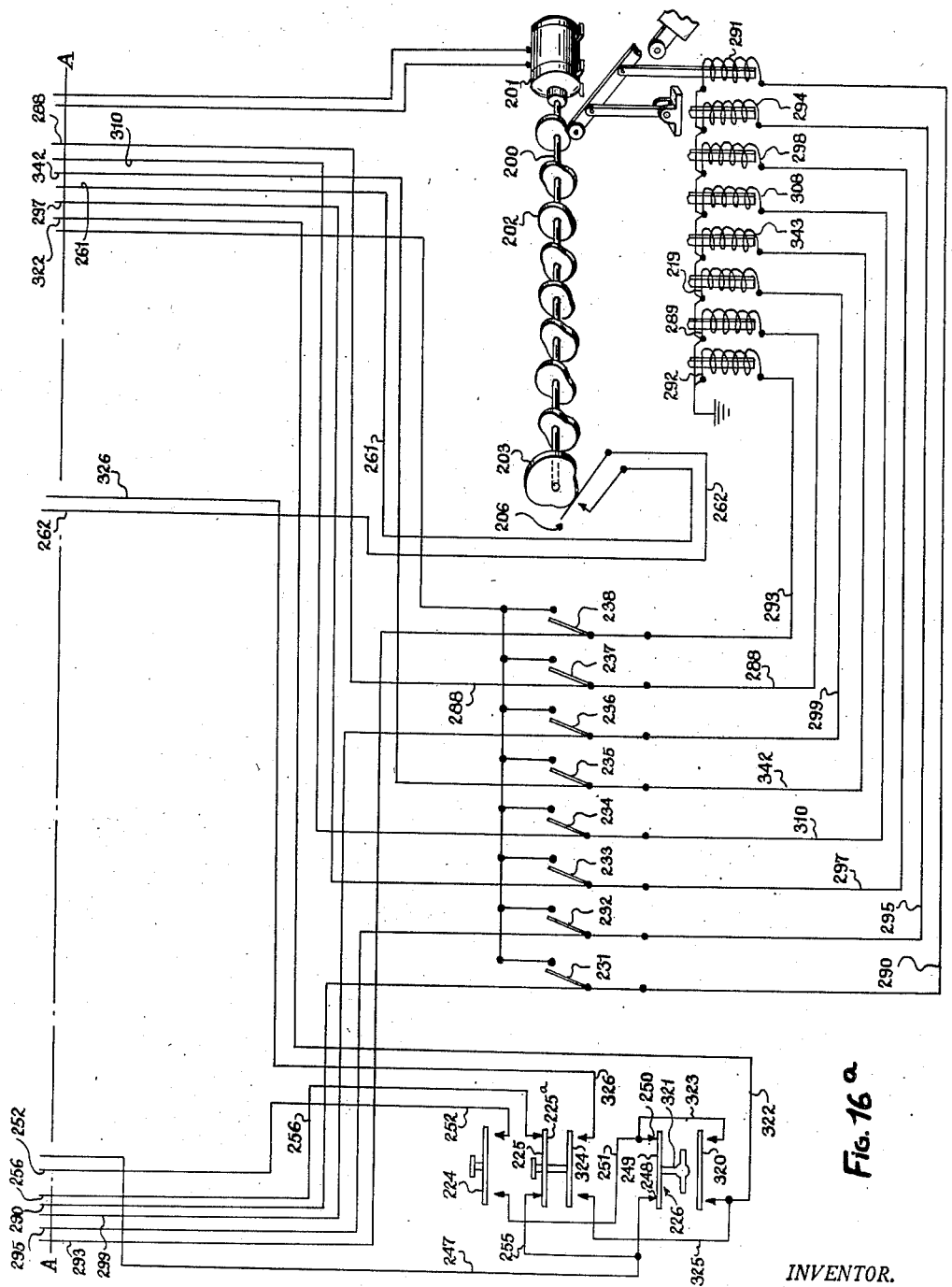

Patented Sept. 22, 1953

2,652,933

UNITED STATES PATENT OFFICE 2,652,933

ASSEMBLING APPARATUS

Alfred R. Willard, East Cleveland, Carl R. Glasener, Cleveland, Fred C. Haak, Jr., Euclid, and Charles A. Young, Cleveland Heights, Ohio, assignors to Willard Storage Battery Company, Cleveland, Ohio, a corporation of West Virginia Application May 18, 1948, Serial No. 27,808

15 Claims. (Cl. 214—6)

This invention relates to an assembling apparatus and, more particularly, to an improved apparatus for automatically assembling storage battery elements and similar articles comprising alternate plate-like members of different construction or character.

The conventional lead-acid type of storage battery comprises a plurality of separate cells connected together in series, the several cells being generally contained in a single housing or casing. Each cell comprises a separate compartment containing electrolyte in which is disposed a battery element comprising a plurality of positive plates and negative plates separated by insulators, commonly termed separators, the several positive plates being connected to a common strap and the several negative plates being connected to a second strap. These straps are provided with posts which are in turn, connected to the posts of the adjacent cell or cells or to an outside circuit.

At the present time it is customary to assemble storage battery elements of the character mentioned, either by hand or by the use of large and expensive machines.

An object of this invention is to provide an improved apparatus for automatically assembling articles composed of alternate plate-like members of different characteristics from supplies of such members, which apparatus is comparatively small in size, relatively inexpensive to manufacture, and is simple and efficient in operation.

Another object of the invention is to provide an improved apparatus for automatically assembling battery elements from supplies of battery plates and separators which is comparatively small in size, simple and efficient in operation, and relatively inexpensive to manufacture.

A further object of the invention is to provide an improved apparatus for automatically assembling battery elements from supplies of battery plates and separators, which apparatus employs a relatively few magazines for the various plates and separators to be assembled, and but a single, vertically movable platform upon which the plates and separators, fed from all the magazines, are automatically assembled in the order which they occupy in the completed element.

A still further object of the invention is to provide an improved apparatus for automatically assembling battery elements from supplies of battery plates and separators which employs the same number of separate magazines for the various plates and separators regardless of the desired number of plates in the element to be assembled, and in which apparatus a selector is provided for conditioning the apparatus to automatically assemble elements having any desired number of plates.

An additional object of the invention is to provide an improved apparatus of the type mentioned in the preceding objects and in which but one separate magazine is provided for each type of battery plate to be employed in the battery element and but two individual magazines are employed for the separators, and means are provided to feed the plates and separators from the magazines and to deliver the fed plates and separators to a single, vertically movable platform in a predetermined sequence.

It is also an object of the invention to provide an improved apparatus of the type defined in the preceding object and in which a means is provided to automatically remove an assembled element from the platform after a predetermined number of plates and separators have been delivered thereto.

Another object of the invention is to provide an improved battery element assembling apparatus which comprises novel fluid pressure actuated mechanisms for effecting the feeding of the plates and separators from the magazines therefor and for delivering the fed plates and separators to a single assembling platform in a predetermined sequence.

A further object of the invention is to provide an improved battery element assembly apparatus having a novel means for sequentially controlling the delivery of battery plates and separators from magazines therefor, in predetermined sequence, to a single assembling platform and for removing an assembled element from the platform, the control means including means for selecting the number of plates and separators in the element assembled and selective means for either effecting repeated automatic assembly of additional elements or termination of operation of the apparatus after a single element has been assembled.

A still further object of the invention is the provision of a novel apparatus for selectively assembling battery elements in which all of the negative plates are alike or in which the end negative plates of the element differ from the other negative plates in the element.

The invention further resides in certain novel features of construction and combination and arrangements of parts, and further objects and advantages thereof will be apparent to those skilled in the art to which it pertains from the following description of the present preferred embodiment thereof, described with reference to the accompanying drawings in which similar reference characters represent corresponding parts in the several views and in which:

Fig. 2 is a front elevational view of the apparatus shown in Fig. 1 with certain parts omitted for the sake of clarity;

Fig. 3 is a side elevational view looking from the left of Figs. 1 and 2, certain of the parts being omitted;

Fig. 4 is a fragmentary sectional view taken substantially on the section-indicating line 4—4 of Fig. 1;

Fig. 5 is a fragmentary sectional view taken on the section-indicating line 5—5 of Fig. 4;

Fig. 6 is a fragmentary sectional view taken substantially on the section-indicating line 6—6 of Fig. 1;

Fig. 7 is a fragmentary sectional view taken substantially on the section-indicating line 7—7 of Fig. 1, Figs. 4 and 7 overlapping in part and, when taken together, representing a substantially continuous sectional view through the apparatus at this point;

Fig. 8 is a fragmentary sectional view taken substantially on the section-indicating line 8—8 of Fig. 7;

Fig. 9 is a fragmentary sectional view taken substantially on the section line 9—9 of Fig. 1;

Fig. 10 is a fragmentary sectional view taken on the line 10—10 of Fig. 9;

Fig. 11 is a fragmentary sectional view taken on the line 11—11 of Fig. 10;

Fig. 12 is a schematic representation of the apparatus indicating, in top plan view, the arrangement of the several magazines, pushers and the assembling platform, the various battery plates and separators being indicated in broken lines in their respective magazines and an assembled element being shown in broken lines upon a stacking tray after its delivery from the assembling platform;

Fig. 13 is a front elevational view of a battery element assembled by the apparatus;

Fig. 14 is an end elevational view of the battery element shown in Fig. 13;

Fig. 15 is a detached view, partly in elevation and partly in section, illustrating one of the novel hydraulic control devices for operating a hydraulic actuator for a portion of the apparatus;

Fig. 16 is one portion of a schematic wiring diagram for the apparatus; and

Fig. 16a is the remaining portion of the schematic wiring diagram for the apparatus, Figs. 16 and 16a when united along the broken line A—A forming a single complete representation of the wiring circuit.

Figure 1:
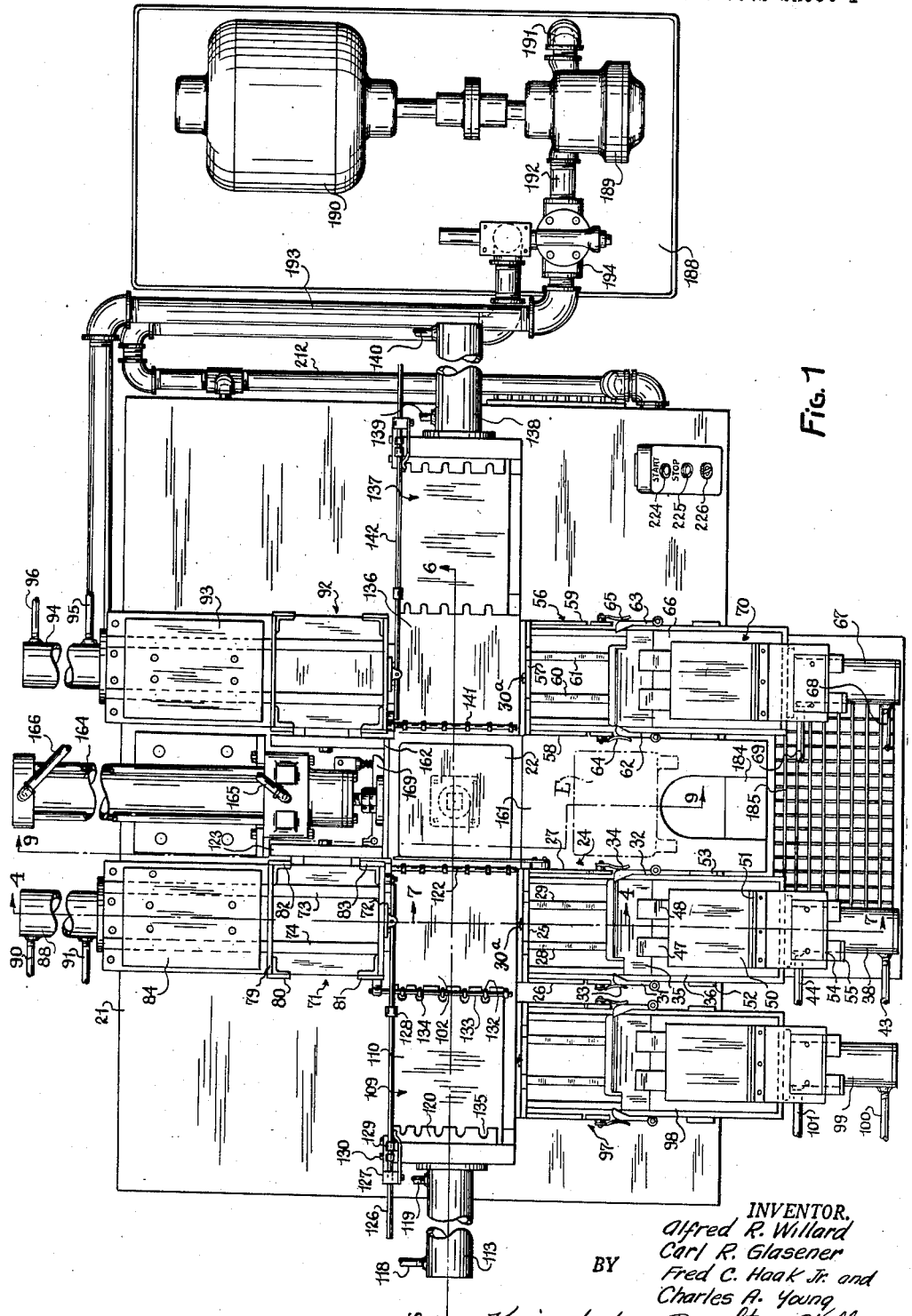
Fig. 1 is a top plan view of an apparatus constructed in accordance with this invention with certain parts broken away to more clearly show the construction.

While the invention is applicable to the assembling of various articles, it is especially suitable for the assembling of storage battery elements of the character heretofore mentioned and the invention is therefore illustrated, by way of example, as embodied in such an apparatus or machine.

The general nature and operation of the machine can be best understood by referring first to Fig. 12 of the drawings which is a schematic representation of the machine looking down upon the top thereof. As shown in this figure, a single vertically movable platform is provided upon which the battery plates and separators are to be assembled into element E, one of which is illustrated in Figs. 13 and 14. Adjacent this platform are disposed separate magazines for negative battery plates, positive battery plates, negative separators and positive separators. In the present construction these magazines are shown as disposed adjacent the corners of the platform; the magazine for the negative plates being adjacent the forward left corner of the platform, the magazine for the positive plates being adjacent the forward right corner, the positive separator magazine being adjacent the rear right corner, and the negative separator magazine being adjacent the rear left corner. It will be readily understood, however, that the positions of these magazines may be interchanged or otherwise disposed if so desired.

The negative plate magazine is provided with negative battery plates by the operator, the plates being held therein in stacked relationship with their lugs in alignment and disposed adjacent the left-hand side of the magazine. Supplies of positive battery plates are placed in the positive plate magazine with their lugs in alignment and disposed adjacent the right-hand side of the magazine. The separators employed may be of any desired type but, for the sake of brevity, this description is restricted to those of the type which have ribs on one face thereof, the other face being substantially planar. Such separators are normally disposed in the battery element with their ribbed faces adjacent the positive plate. Consequently, while the separators supplied to the magazines, designated negative separator and positive separator, respectively, are the same in construction, the separators placed in the former magazine have their ribs directed upwardly while those disposed in the positive separator magazine have their ribs directed downwardly.

Each magazine is provided with a feeder mechanism which is hydraulically actuated under the joint control of an electrical circuit and a rotating cam shaft so that the plates and separators are fed from the magazines and delivered to the platform in predetermined sequence. As presently constructed, the machine is such that a negative plate and a negative separator are fed substantially simultaneously toward each other and come to rest upon a collecting trough intermediate the magazines for these members. This is possible by virtue of the fact that the bottom of the magazine for the negative plates is slightly lower than the bottom for the magazine of the negative separators so that the negative separator is fed on top of the negative plate. At the same time that the negative plate and negative separator are fed, a positive plate and positive separator are likewise simultaneously fed toward each other and come to rest with the separator upon the positive plate and both resting in a common collecting trough between the magazines for the positive plates and the positive separator.

Immediately after the plates and separators are thus fed, a negative pusher member and a positive pusher member operate substantially simultaneously to deliver the negative plate and its separator onto the common assembling platform, and to deliver the positive plate and its separator onto the platform on top of the negative plate and separator. This is rendered possible by virtue of the fact that the collecting trough between the negative plate and the negative separator magazines is at a lower elevation than the collecting trough between the positive separator and the positive plate magazines. Consequently, a "book" of plates and separators is now disposed upon the platform, this "book" comprising a negative plate on which rests the planar surface of a separator with the ribs of the latter being directed upwardly and having a positive plate resting thereon, and the latter in turn supporting a separator with its ribs directed downwardly. The platform moves vertically downwardly a predetermined distance as the positive plate and positive separator are delivered thereto and these operations are repeated until a battery element of the preselected size, and lacking only the final negative plate, has been assembled upon the platform.

The next operation then occurring is the feeding of a negative battery plate to the collecting trough and delivery of this plate to the platform on top of the plates and separators previously arranged thereon. This completes the element which is moved by an ejector from the platform onto a stacking tray. The platform is then returned to its initial position at which time the operations are repeated to assemble a new element. While the new element is being assembled, the operator removes the assembled element from the stacking tray which tray may be employed as a work table for aligning the edges of plates and separators, if necessary.

The machine is so controlled, as hereinafter described, that it may be set to assemble an element of any desired number of plates, with the necessary separators, by simply setting an electrical switch to the corresponding indication. Moreover, the machine may either continue in operation after an element is assembled, to automatically repeatedly assemble similar elements, or it may be so adjusted as to automatically stop after a single element has been assembled. Furthermore, each battery and separator feeding mechanism, each pusher, and the ejector may be individually operated, if desired, by actuation of separate electrical switches.

In certain types of storage batteries it is desirable that the negative plates on the outer faces or ends of a battery element be different from those within the element. For example, the end negative plates, as they are called, may be thinner than the other negative plates. The present machine is capable of assembling battery elements in which all of the negative plates are alike, as previously described, or elements in which the end negative plates are different from the other negative plates of the element. For this purpose, an additional negative plate magazine is provided adjacent the previously mentioned negative plate magazine and the special negative plates are disposed in this magazine. Also, the control circuit for the machine is provided with a manually settable electrical switch which conditions the machine to effect assembly of elements of either type.

When the machine is set for assembling an element of the type having special end negative plates, the initial element so assembled is commenced by manually effecting delivery of one of the special end negative plates to the collecting trough between the magazines for the regular negative plates and separators. This may be effected by either manually laying such special negative plate upon the collecting trough or by operating the electrical switch to actuate the feeder for the special negative plate magazine which will deliver one of the end negative plates onto the top of the negative pusher member. A single actuation of the negative pusher now causes the latter to move forwardly until it is disposed substantially between the magazines for the negative separators and the regular negative plates. Pivoted fingers ride over the top of the pusher member and the special negative plate thereon during this forward movement but drop into the path of the special negative plate as the pusher is withdrawn so that the negative plate is retained in the collecting trough.

After a special negative plate has been disposed in this collecting trough by either of the methods just described, the machine is started in automatic operation and during the first cycle thereof the mechanism for feeding a regular negative plate does not operate so that the negative separator which is fed is disposed upon previously fed special negative plate, the feeding of a positive battery plate and positive separator and the delivery of the plates and separators to the assembling platform being as previously described. Thereafter the machine continues in operation as previously described except that on the next-to-the-last cycle in the assembling of a complete element, plates and separators are fed from all of the magazines so that a plate is now fed from the special negative magazine as well as from the regular negative plate magazine. The special negative plate which is fed at this time comes to rest upon the negative pusher member and, as the latter moves the regular negative plate and its separator onto the assembling platform, the special negative plate is deposited in the collecting trough by the previously mentioned pivoted fingers.

The next operation of the machine is the feeding of a single special negative plate onto the negative pusher member, there being no feeding of separators or positive plate at this time. The negative pusher is then operated and the special negative plate resting in the collecting trough is moved onto the element being assembled upon the platform thus completing the latter, while the special negative plate which rests upon the pusher is retained in the collecting trough as the pusher is retracted. Consequently, elements of this type may thereafter be automatically assembled since at the completion of the assembly of each element a special negative plate is waiting in the collecting trough for the beginning of a new element of this type, it being remembered that the first cycle in the assembly of such an element omits the feeding of a regular negative plate so that the negative separator which is fed is disposed upon the special negative plate and the two are delivered together to the platform at substantially the same time that a positive plate and separator are delivered thereto.

The details of the machine which enables it to operate in accordance with the above brief summary will now be understood by reference to the other figures of the drawings. As shown therein, the machine comprises a frame, generally designated 20, which may be constructed of angle irons or welded plates suitably connected together to form a table-like structure having a substantially flat top portion 21. Substantially centrally of the top portion is a vertically movable platform 22 upon which the plates and separators are assembled into a completed battery element. This platform is adapted to be moved vertically downwardly in timed relationship with the operation of the machine in a manner hereinafter described in detail.

Adjacent the left side of the platform 22 and forwardly thereof, as viewed in Fig. 1, the top portion 21 of the frame is provided with upstanding supporting members 23 which mount a supply magazine, generally designated 24, for regular negative battery plates, see also Fig. 1, 2, 4 and 7. This magazine has its front 25 and sides 26 and 27 formed by upstanding plates or bars suitably connected together in a manner such that battery plates are retained therein in stacked arrangement, as shown in Figs. 4 and 7, the lowermost plate resting upon spaced parallel extending rails 28 and 29 which extend forwardly and rearwardly of the magazine. The plate or plates forming the front 25 of the magazine are spaced above the rails 28 and 29 and slidably support a vertically adjustable plate 30 which is adjusted towards and away from the upper surface of the rails 28 and 29 to provide a space therebetween slightly greater than the thickness of a battery plate. The plate 30 is held in adjusted position by a bolt 30a which passes through a hole in plate 30 and through a vertical slot in the central plate or bar forming a part of the front 25 of the magazine, the bolt having a nut on its outer end to clamp the plate 30 in its adjusted position.

Adjacent the vertical rear edges of the plates or bars forming the sides 26 and 27 of the magazine are vertically extending bars 31 and 32, which are pivotable about vertical axes and have inwardly directed edges normally urged inwardly of the rear portion of the magazine by spring 33 and 34, these inwardly directed portions of the bars 31 and 32 normally being positioned immediately behind the edges of the battery plates in the magazine to prevent the plates from being displaced therefrom. The bars 31, 32 are rocked outwardly, as hereinafter described to permit the feeding of additional plates into the magazine after which the springs 33, 34 again return the members 31, 32 to their positions as shown in Fig. 1 to retain the battery plates within the magazine.

The lowermost battery plates in the magazine are further retained therein by an abutment member 35 which is vertically spaced above the rails 28, 29 and coacts therewith to provide a guide slot for a picker or feeder member 36. This picker or feeder member 36 comprises a plate which is slidable upon the top surface of the rails 28, 29 forwardly and rearwardly thereof under the action of a fluid pressure operated actuator, generally designated 37. This actuator comprises a cylinder 38 in which is disposed a piston 39 to which is connected a piston rod 40, the cylinder being attached to an apertured bracket 41 secured to the supports 23 for the magazine with the piston rod 40 extending therethrough. The forward end of the piston rod 40 is secured to a downwardly depending bracket member 42 which is connected with the feeder plate 36. This bracket member 42 has outwardly directed flange portions which ride upon guide rails 45 and 46, connected with the supports 23 for the magazine, and the upper face of the bracket member 42 is suitably apertured to accommodate the guide rails 28, 29. The cylinder 38 is provided with ports adjacent its ends to which conduits or pipes 43 and 44 are connected for conducting fluid under pressure to and from the cylinder, as hereinafter described.

The construction just described is such that when fluid under pressure is supplied through the pipe or conduit 43 the piston 39 moves to the left, as viewed in Fig. 7, thus moving the bracket 42 in the same direction, the latter carrying with it the feeder plate 36 which is so supported as to be in abutting alignment with the lowermost battery plate in the magazine 24. Consequently, this battery plate is engaged and fed forwardly below the adjustable plate 30 and into a receiving trough in front of the magazine. Fluid pressure supplied through the pipe or conduit 44 moves the feeder plate 36 in the reverse direction, back to the position shown in Fig. 7, whereupon the battery plates within the magazine 24 move downwardly a distance equal to the thickness of the plate just fed so that the next movement of the feeder plate 36 in the forward direction again feeds a battery plate from the magazine.

Since the battery plates which are contained within the magazine 24 and are fed therefrom are relatively heavy and somewhat fragile, a means is provided for filling the magazine from the rear, from time to time, so that the plates do not need to be lifted and dropped into the magazine at the top thereof. For this purpose a second pair of parallel rail-like members 47 and 48 are supported by bracket members, or the like, 49 upon the supports 23 for the magazine, the rails 47, 48 being spaced above the feeder plate 36 and having their top surfaces aligned with, or slightly higher than, the top surface of the abutment member 35. A plate-like member 50 is slidable upon the guide rails 47 and 48 and has an upstanding plate 51 connected thereto for movement therewith to provide a back support for a stack of battery plates which are to be introduced into the magazine 24. Adjacent the sides of the plate 50, but spaced therefrom so as to be substantially aligned with the previously mentioned sides 26 and 27 of the magazines are vertically extending side plates or bars 52 and 53. These plates or bars are connected at their lower ends with the supports 23 for the magazine and extend vertically upward to confine and guide the side edges of the battery plates which are to be moved into the magazine 24. Movement of the plate 50 together with the battery plates thereon is effected by the operator grasping and pushing a handle-like member 54 which is attached to the plate 50.

To maintain a supply of regular negative battery plates in the magazine, the operator places a quantity of such battery plates upon the plate 50 in front of the rear plate 51 and between the side plates or bars 52 and 53. He then pushes forwardly on the handle 54 when the level of the plates in the magazine drops below the top of the abutment member 35. This causes the plate 50 to slide upon the rails 47 and 48 and as the plate 50 moves forwardly, the forward edges of the battery plates thereon engage the pivoted members 31, 32 rocking these members outwardly slightly against the action of the springs 33, 34 so that the plates freely move into the magazine 24. As the plate 50 is now moved rearwardly the pivoted members 31, 32 again move inwardly behind the battery plates just positioned within the magazine engaging the adjacent corners of the latter and preventing their movement in the rearward direction with the plate 50. One of the rails such as 47 is preferably provided with a stop lug or abutment 55 to limit the rearward movement of the plate 50. The operator may place a new supply of battery plates upon the plate 50 at his convenience for movement into the magazine when the level of battery plates in the latter drops below the top of the member 35.

A second magazine, generally designated 56 is also provided upon the top 21 of the frame, this magazine being disposed adjacent the right-hand side of the platform 22 and forwardly thereof as viewed in Fig. 1 and is adapted to contain supplies of positive battery plates. This magazine is disposed at a slightly higher elevation but is otherwise identical with the magazine designated 24, the front 57 and sides 58 and 59 being constructed in the same manner as the front and sides of magazine 24. Likewise, the front 57 is spaced above parallel guide rails 60 and 61 upon which the battery plates to be fed are supported, there being an adjustable plate not shown, by which the separation between the rails 60, 61 and the lower edge of the forward portion of the magazine may be adjusted. Adjacent the rear edges of the plates or bars 58 and 59 are provided pivoted members 62 and 63 which are identical with the previously described members 31, 32 and function in the same manner and for the same purpose, these members being normally urged inwardly by springs 64 and 65. The feeding mechanism for the magazine 56 comprises a picker or feeder member 66 connected for actuation by a piston disposed in a fluid pressure actuator cylinder 67 to which are connected fluid pressure supply and exhaust conduits 68 and 69, this feeding mechanism operating in the same manner as that previously described for the magazine 24. The magazine 56 is also provided with a mechanism generally designated 70 by which supplies of positive plates may be moved into the magazine 56 in the same manner as the negative plates are moved into the magazine 24. The parts of this mechanism 70 are identical with those previously described for this purpose in connection with the magazine 24 and hence need not be specifically described in detail.

To the left side of the movable platform 22, and rearwardly thereof so as to be substantially aligned with the negative plate magazine 24, is disposed a magazine generally designated 71 for containing plate separators which are fed one-by-one in accordance with the operation cycle of the machine. This magazine 71 is supported upon the top 21 of the frame by vertically extending support members 71a the heights of which are such that the bottom of the magazine is at slightly higher elevation than the bottom of the magazine 24. The forward portion of the magazine 71 is defined by a vertically extending plate 72 the lower edge of which is spaced vertically above horizontally extending rail-like members 73 and 74 upon which the bottoms of the separators within the magazine rest. The forward face of the plate 72 is provided with parallel, spaced guides 75 which support and guide a vertically adjustable member 76, movement of the latter being effected by a screw 77 attached thereto which is threaded through a nut 78 supported for rotation upon the face of the plate 72 but held from axial displacement with respect thereto. By rotating the nut 78 the lower edge of the member 76 may be raised or lowered thereby defining the width of the opening between the lower edge of the latter and the top surfaces of the guide rails 73 and 74, this separation being such that only a single separator may pass therethrough from the magazine 71.

The rear of the magazine 71 is defined by the second vertically extending plate 79, spaced from the plate 72 a distance slightly greater than the height of the separators. Connected with the plates 72 and 79 are angle members which in turn support the side plates or bars such as 80, 81, 82 and 83 for the magazine 71.

The rails 73 and 74 extend rearwardly of the magazine 71 proper and upon the upper surface of these rails is slidably supported a picker or feeder member 84 which is adapted to be moved forwardly and rearwardly upon the rails to thereby engage the lowermost separator within the magazine 71 and to feed the latter forwardly therefrom and into the receiving trough disposed between the magazine 71 and the magazine 24. In order to effect this movement the feeder plate 84 is bolted or otherwise secured to a bracket-like member 85 having flange portions extending beneath the rails 73, 74 and having a downwardly directed portion connected with a piston rod 86 for movement by the latter. Suitable spacer members, such as 85a and 85b, are interposed between the feeder plate 84 and the bracket member 85 to space the former from the latter and prevent binding on the rails. The piston rod 86 extends through an opening in a supporting bracket 87 upon which is mounted a fluid pressure operated actuator or cylinder 88, the piston rod 86 extending into this cylinder and being connected with a piston 89 therein. Fluid under pressure is supplied to and/or exhausted from cylinder 88 through fluid conduits 90, 91 to thereby effect movement of the feeder plate 84 and feeding of the separators contained in the magazine 71.

As mentioned above, the magazine 71 has its guide rails 73, 74 located at a slightly higher elevation than the corresponding guide rails 28, 29 of the negative plate magazine 24. Consequently, a negative battery plate and a separator may be fed from these magazines simultaneously into the receiving trough located therebetween without danger of interference, with the separator coming to rest upon the battery plate.

Adjacent the right-hand side of the platform 22, and rearwardly thereof so as to be substantially aligned with the plate magazine 56, is a second separator magazine generally designated 92. This magazine 92 is identical in construction with that designated 71 and hence the details thereof need not be repeated except to note that the separators contained therein are fed forwardly one at a time from the magazine by a feeder plate 93 actuated by a piston within a fluid pressure operated actuator or cylinder 94 having fluid pressure supply and exhaust conduits 95 and 96. The lower portion of this magazine 92 is disposed at a slightly higher elevation than the corresponding portion of the magazine 56 so that a positive battery plate and a separator may be fed from the magazines 56 and 92, respectively, simultaneously without interference therebetween and so that the fed separator comes to rest upon the fed plate with both disposed within the receiving trough located between the magazines.

In addition to the magazines previously described, the machine is preferably provided with additional battery plate magazine, generally designated 97, for containing special negative plates which are generally thinner than the regular negative plates contained in the magazine 24. This magazine 97 is constructed in the same manner as the previously described plate magazine 24 and has the same means for supplying plates thereto so that the description of this mechanism need not be repeated. As in the case of the magazine 24, the magazine 97 has a feeder plate or member 98 adapted to feed one plate at a time, from the bottom of the supply of battery plates within the magazine, forwardly therefrom, the feeding plate being controlled by a fluid pressure operated actuator or cylinder 99 having fluid pressure supply and exhaust conduits 100 and 101 connected therewith.

As previously mentioned and as shown in Figs. 1, 4, 6 and 7, a receiving trough is disposed between the magazines 24 and 71. This trough comprises a flat, plate-like member 102 supported upon the top 21 of the frame by suitable support members, such as 103, 104, 105, 106, 107 and 108, the top surface of the trough 102 being disposed below the bottoms of the adjacent magazines 24 and 71. A pusher member, generally designated 109, is slidably supported upon the top of the trough member 102, this pusher member being adapted to be moved over the top surface of the trough member to push or deliver the negative plate and separator, which have been fed from the hoppers 24 and 71, onto the platform 22. In addition, the pusher member 109 is adapted to move a special or end negative plate, which has been fed from the magazine 97, forwardly into the portion of the trough 102 between the magazines 24 and 71.

The pusher member 109 includes a top plate-like member 110, which is slidably supported upon the trough member 102, and an abutment portion 111, which is provided adjacent the forward end of the plate 110, to engage and move a negative battery plate and separator fed from the magazines 24 and 71, respectively.

Movement of the pusher member 109 is effected by means of a fluid pressure actuated piston 112 contained in an actuator or cylinder 113 which is mounted upon the support member 108, the piston 112 being provided with a piston rod 114 which is connected with a bracket member 115 secured to the pusher member 109. The bracket member 115 has outwardly extending flanges which are guided by rail-like brackets 116 and 117 attached to the supporting members 104 and 107 for the trough. Fluid pressure is conducted to and from the cylinder 113 through supply conduits 118 and 119 in predetermined sequential relationship as hereinafter described. The pusher member 109 is further provided with a rear abutment member 120 having an upstanding shoulder adapted to engage a special or end negative plate fed onto the portion 110 of the pusher member to move this battery plate towards the platform 22 when the pusher member is actuated.

Adjacent the forward end of the trough member 102, and hence adjacent the corresponding side of the platform 22, are a plurality of downwardly directed fingers 121 which are mounted upon a shaft 122 extending substantially across the width of the trough 102. The end of the shaft 122 extends rearwardly of the machine beyond the corresponding side edge of the trough 102 and has that end received in a bore provided in an angular extension of a bar 123 pivoted to a portion of the support for the magazine 71. Extending upwardly from the shaft 122, adjacent the point at which the shaft enters the bore in the bar 123, is a link 124 the upper end of which is pivotally connected to one end of a bell crank lever 125. The bell crank lever 125 is pivoted intermediate its ends to the front plate 72 of the magazine 71. Pivotally connected to the second arm of the bell crank lever is a pull rod 126 extending at one side of, and substantially parallel with, the trough member 102, the rear end of this rod being slidably supported in an upstanding bracket 127 connected to the supports for the trough member.

Adjustably mounted upon the pull rod 126 are a pair of spaced collar-like abutment members 128 and 129 between which is movable an upstanding arm 130 attached to the rear end of the pusher member 109, the arm 130 adjacent its upper end having a recess in a side thereof for slidingly receiving the pull rod 126. The arm 130 is adapted to move with the pusher member 109 and to strike the collars 128 and 129 adjacent the limits of its movement thereby moving the pull rod 126 longitudinally in a direction corresponding to the direction of movement of the pusher member 109 and thus move the fingers 121. The bracket member 127 is provided with a spring 131, the forward end of which bears upon the pull rod 126 in advance of the forwardmost position of the collar 129. This spring provides a friction drag upon the pull rod 126 tending to retain the latter in the position to which it is moved by successive engagements of the member 130 with the collars 128 and 129.

The construction just described is such that, after a regular negative battery plate and a corresponding separator have been fed into the receiving trough 102, the pusher member 109 is actuated to move this plate and separator onto the top of the platform 22. During this forward movement of the battery plate and separator the shaft 122, with the fingers 121 thereon, have been rocked upwardly about the pivot of the bar 123 so that the fingers 121 are removed from the path of the battery plate and separator. This movement of the fingers was effected by the engagement of the member 130 with the collar 129 in the previous rearward movement of the pusher 109, the engagement of member 130 with the collar 129 having pulled the rod 126 to the rear thereby rocking the bell crank lever 125 clockwise, as viewed in Fig. 6, the spring 131 holding the pull rod 126 and consequently the fingers 121 in this position as the pusher member 109 now moves forwardly.

As the pusher member 109 completes the delivery of the negative battery plate and separator to the platform 22 the member 130 moves into engagement with the collar member 128 moving the latter to the right, as viewed in Fig. 6, thereby rocking the bell crank lever 125 in a clockwise direction and restoring the fingers 121 to their lowermost positions which is the position shown in Fig. 6. The fingers 121 are permitted to drop to this position due to the presence of notches 132 in the forward edge of the member 111 and the plate 110, spacing of which notches correspond with the spacing of the fingers 121. Consequently, when the pusher member 109 is next moved rearwardly the fingers 121 are in the path of the battery plate and separator just delivered to the platform 22 so that they cannot be withdrawn from the platform as might happen if a foreign substance should lodge between the edge of the pusher member and the edges of the plate or separator thus tending to cause the latter to adhere to the pusher member and be withdrawn as the latter moves rearwardly. When the pusher member 109 reaches its initial position, slightly to the left of the position shown in Figs. 1 and 6, the member 130 again strikes the collar 129 moves the latter and hence the pull rod 126 to the left, as viewed in Fig. 6, again rocking the fingers 121 upwardly and out of the path of movement of the next succeeding battery plate and separator which are fed to the receiving trough and moved therefrom onto the platform.

Extending transversely of the member 109, adjacent the forward edge thereof, when in its retracted position, and spaced thereabove is a second finger shaft 133 provided with downwardly extending, spaced fingers 134, see Figs. 1 and 6. This shaft and its fingers are continuously urged to the position shown in Fig. 6 by a coil spring or the like, not shown, the fingers being rockable in a counterclockwise direction, as viewed in Fig. 6, against this biasing action by movement of the pusher member therepast. These fingers are provided to effect stripping of a special or end negative plate from the top of plate 110 and to dispose such special negative plate in the receiving trough 102.

That is to say, when the machine calls for a special or end negative plate, the latter is fed from its magazine 97 by operation of the actuator 99, the plate thus fed coming to rest upon the plate 110 of the pusher member 109. As the pusher member 109 is then moved forwardly the fingers 134 are rocked, the battery plate being carried thereunder since its edge is in engagement with the upstanding flange provided by the member 120 of the pusher member. When the pusher member has advanced its maximum distance toward the platform 22, the fingers 134 rock back to their initial positions, as shown in Fig. 6, this being permitted by notches such as 135 formed in the member 120 and corresponding in size and spacing with the lower ends of the fingers 134. Then, as the pusher member 109 is moved back to its initial position the fingers 134 engage the adjacent edge of the battery plate upon the pusher member and strip the former from the latter so that the former comes to rest upon the forward portion of the trough member 102. The next movement of the pusher member 109 towards the platform 22 will then deliver the negative plate now resting upon the trough member 102 to the platform as in the case of regular negative plates fed from the magazine 24.

Supported upon the top 21 of the frame 20 intermediate the magazines 56 and 92 is a second trough plate 136. This trough plate is supported in the same manner as the plate 102 and is provided for the same purpose, the only difference being that plate 136 is at a slightly higher elevation than the plate 102. Slidable upon the plate 136 is a pusher member 137 which is constructed in the same way and operates in the same manner as the pusher 109, the pusher member 137 being actuated by a piston within an actuator or cylinder 138 which has fluid supply and exhaust conduits 139 and 140. Adjacent the forward end of the trough plate 136 are provided a plurality of downwardly directed fingers 141 which are actuated by a pull rod 142 in accordance with movement of the pusher member 137 in the same manner as are the fingers 121.

The movable platform 22 is supported upon the upper end of a generally rectangular shaped bar 143 which extends through an opening in the top 21 of the frame and has one side thereof provided with two spaced sets of ratchet teeth 144 and 145, the bar, and hence the platform, being guided for a straight line vertical movement by a rectangularly shaped housing 146 attached to the lower surface of the top 21 of the frame. A tension spring 147 is connected between the lower portion of the bar 143 and the bracket-like guide member 146 to normally hold the platform 22 in its uppermost position, see Figs. 6 and 9. The platform 22, is, however, moved downwardly against the force of the spring 147 in predetermined timed relationship with the operation of the machine by a pawl member 148, the forwardly projecting end of which engages in the ratchet teeth 145.

The lower end of the pawl member 148 is pivotally connected to an actuating arm 149, intermediate the ends of the latter. One end of the member 149 is pivoted to a portion of the supporting framework 20 while the other end of the member 149 has an upstanding shoulder portion for cooperation with a roller 150 mounted in the lower end of a vertically movable rod 151. The rod 151 is slidably supported within a guide sleeve 152 connected to the lower surface of the top 21 of the frame, the rod 151 extending through an opening in the top 21 and having its upper end provided with a second roller 153. This roller 153 is disposed in the path of a cam-shaped extension 154, see Fig. 2, provided on the bottom of the pusher member 137 as an integral part of, or an attachment to, the bracket which connects the pusher member 137 to the piston rod of cylinder 138. Consequently, when fluid pressure, supplied to the cylinder 138 through the conduit 140, moves the pusher member 137 towards the platform 27, the cam 154 upon this pusher member engages the roller 153, near the end of the forward movement of the pusher member, thereby depressing the rod 151 and hence rocking the actuating member 149 downwardly. The pawl member 148, being in engagement with one of the ratchet teeth 145, therefore pulls the bar 143 and the platform 22 vertically downward. The bar 143 and platform 22 are held in this position by a retaining pawl 155, the forwardly projecting tooth portion of which engages one of the ratchet teeth 144 so that when the pusher member 137 is thereafter moved back to its initial position, as shown in Figs. 1 and 2, the platform 22 is retained in its new position.

When the cam member 154 moves from engagement with the roller 153, the latter is again moved upwardly by a spring 156 which is connected between the actuating member 149 and a portion of the guide 146 for the bar 143. This upward movement of the actuating member 149 causes the pawl 148 to move upwardly and engage the next tooth upon its cooperating ratchet teeth 145, this action being due to the fact that the pawl member 148 is continuously urged into engagement with the teeth 145 by a compression spring 157 extending between the pawl member and a fixed upwardly extending arm 158 connected to the actuating arm 149, the pawl being shaped, as well known in the art, so that it may latch over the teeth 145 when moved in the upward direction but cannot so latch over the teeth when moved in a downward direction to effect downward movement of the platform 22. The pawl member 155 is continuously urged into engagement with the teeth 144 by a compression spring 159 extending between this pawl member and a bracket 160 attached to the guide 146 for the bar 143. This pawl is shaped to latch over the teeth 144 when the platform 22 moves in the downward direction but engages with the teeth to prevent movement of the platform in the upward direction. Therefore, the platform 22 is moved vertically downwardly a distance equal to the space of one tooth of the ratchet teeth 144 and 145 each time the positive pusher member 137 is actuated so that the platform thus moves only once for each negative plate, negative separator, positive plate and positive separator delivered thereto.

When sufficient plates and separators have been delivered to the platform 22 to constitute a completed element of the size for which the machine has been set, this completely assembled element is then automatically removed from the platform and pushed forwardly upon a receiving surface 161 provided upon the top 21 of the frame intermediate the magazines 24 and 56, the element then occupying a position substantially as shown in broken lines in Fig. 1. This removing operation is effected by means of an ejector plate 162 which is connected with a piston rod 163. The piston rod 163 is connected with a piston in an actuator or cylinder 164 which has fluid pressure supply and exhaust conduits 165 and 166, the construction being such that the ejector plate 162 is moved forwardly over the surface of the platform 22 to remove an assembled element therefrom and then returns to its initial position as hereinafter described.

As shown in Fig. 9, a tubular support 167 is mounted upon the top 21 of the frame to the rear of, and adjacent one edge of, the platform 22 as viewed in Fig. 1, this tubular housing extending through an aperture in the top 21 so as to have its ends disposed above and below the latter. The tubular housing 167 journals a rock shaft 168 which has its upper end connected to one end of an arm 169. A compression spring 170 extends between the rear face of the arm 169 and a bracket 171 provided upon the top 21 of the frame to thereby continuously bias the arm 169 into engagement with the rear face of the ejector plate 162, see Fig. 10. The lower end of the rock shaft 168 has a bell crank lever 172 connected thereto for rocking therewith. The outer end of the arm 173 of this bell crank lever has a release member or arm 174 pivoted thereto and a compression spring 175 is mounted between this release arm 174 and the other arm 176 of the bell crank lever 172. Consequently, the release arm 174 is continuously urged towards the bar 143, connected with the platform 22, but is held spaced therefrom by a projection 177 upon the latter which bears upon a downwardly extending portion 178 integral with the arm 174.

When the platform 22 is moved downwardly during the assembling of a battery element, as previously described, the projection 177 is moved from engagement with the portion 178 of the arm 174, and when the assembling of an element on the platform 22 is completed, the ejector plate 162 is moved thereacross to remove an assembled element therefrom. The arm 169 tends to follow the plate 162 thereby rocking the shaft 168 and the bell crank lever 172 in a clockwise direction as viewed in Fig. 10. Since the abutment 177 has moved from engagement with the projection 178, this movement of the bell crank lever brings the outer end of the arm 174 into abutting engagement with a wear plate 179 provided upon a downwardly extending arm 180 which is pivoted to the shaft upon which the retaining pawl 155 is mounted.

The downwardly extending arm 180 has a portion which extends in abutting engagement with a projection 181 provided upon the pawl member 148. A second downwardly extending arm 182 is integral with, or connected to, the arm 180 in parallel, spaced relationship therewith, this latter arm having a portion extending in engagement with a projection 183 provided upon the retaining pawl 155. Therefore, when the ejector plate 162 is again moved rearwardly to its initial position, the resulting engagement of the plate 162 with the arm 169 now rocks the shaft 168 and the bell crank lever 172 back to their initial positions and during this rocking movement the release arm 174, which is in engagement with the wear plate 179, moves the latter and hence the arms 180 and 182. Movement of these arms 180, 182 withdraws the pawls 148 and 155 from engagement with their cooperating ratchet teeth so that the spring 147 returns the platform 22 to its uppermost position. As the platform 22 nears its uppermost position, the projection 177 strikes the projection 178 on the arm 174 returning the parts to their positions as shown in Figs. 9 and 10 so that the platform is now held at its uppermost position and the pawls are again engaged with their cooperating ratchet teeth.

The table 161 is preferably provided with a cut-out portion 184, see Fig. 1, for the reception of the operator's hand to facilitate removal of the assembled element from the table. The forward portion of the frame 20 is preferably provided with a stacking surface 185 upon which the element may be up-ended and tapped to even or align the edges of its plates if desired, this surface is shown as a grate, but may be a plate provided with a plurality of holes, communicating with a manifold 186, see Fig. 3, which is in turn connected by a pipe 187 to a suitable air exhausting means or partial vacuum, not shown.

As mentioned heretofore, the feeders for the battery plates and separators, as well as the pusher elements and the ejector, are all operated by fluid under pressure, the operations of these members being in predetermined timed sequence under control of a novel mechanism which is partly mechanical and partly electrical. Consequently, the timing of the operations of these movable members may be more accurately controlled than is possible with conventional mechanisms which are entirely fluid pressure operated, the improved mechanism nevertheless possessing the advantages of power and length of stroke characteristic of fluid pressure operated actuators.

Referring now to Figs. 1 and 2 of the drawings, it will be observed that a tank or reservoir 188 for the pressuring fluid is provided adjacent the frame 20. While this tank has been shown as disposed at one side of the frame it will be understood that it may be mounted therein if so desired. Upon the top of the tank or reservoir 188 is provided a pump 189 which is driven by an electric motor 190, the pump having its inlet connected to a pipe 191 extending into the tank or reservoir 188 and its outlet connected with a pipe 192. The pipe 192 is connected to the main fluid pressure supply conduit 193 of the machine, a pressure regulator 194 being interposed between the pipes 192 and 193 which pressure regulator has a connection 195 with the tank or reservoir 188 so that fluid pressures in excess of a predetermined value may be relieved to the tank 188 through the pipe 195 with the result that the pressure of the fluid supplied to the conduit 193 remains substantially constant in value. From the main supply conduit 193 a plurality of branch conduits conduct the fluid under pressure to valves, generally designated 197, which control the flow of the fluid pressure in a manner hereinafter described to the fluid supply and exhaust conduits for the corresponding actuators or cylinders of the apparatus, it being understood that there is one valve such as 197 for each of the cylinders previously mentioned.

These valves 197 are all identical and are mounted in two spaced substantially parallel rows upon brackets such as 198 which are in turn supported from a transversely extending plate-like support 199 forming a part of the frame 20. Intermediate the two rows of valves 197 is disposed a cam shaft 200 which is operatively connected for rotation by an electric motor 201 supported upon the plate 199 adjacent the rear of the machine, see Fig. 3. This cam shaft 200 is provided with a plurality of axially spaced cams 202 which are identical in shape and are adapted to actuate the valves 197, there being one cam 202 for each valve 197 which it will be remembered are the same in number as the actuators or cylinders of the machine. In addition, the cam shaft 200 is provided with a cam 203 which cooperates with a cam follower 204 provided on the rock arm 205 of an electrical switch 206 suitably supported upon the plate 199.

Fig. 15 of the drawings illustrates the valve 197 which is connected to the actuating cylinder 138 for the positive pusher 137. It will be understood that the constructions herein shown are the same for each of the other actuators 38, 67, 88, 94, 113 and 164 for moving the several feeding members, the negative pusher member and the ejector member. Hence, the description with respect to Fig. 15 will suffice for the corresponding mechanisms associated with each of the other similar operative parts of the device.

As shown in Fig. 15, the valve 197 comprises a casing 207 through the forward wall of which slidably projects the valve actuating rod 208. The portion of the rod 208 within the casing 207 is provided with two spaced, disk-shaped valve members 209 and 210 which move with the rod 208 to selectively control the flow of fluid pressure through the valve. The actuating rod 208 and its valve members 209, 210 are normally moved to the position shown in Fig. 15 by a compression spring 211 disposed within the casing 207 and bearing against the rear face of the disk-like valve member 210. The valve casing 207 is provided with a plurality of ports to which are connected conduits leading to the main supply conduit 193, the fluid pressure return conduit 212 and the conduits 139, 140 of the actuator or cylinder 138. Thus, a conduit 213 is connected from the main supply conduit 193 to a port in the valve 197 which is located intermediate the disk valve members 209 and 210 when the latter are in the positions shown in Fig. 15. The end portions of the casing 207 of the valve, in front of and behind the valve members 209 and 210, respectively, are provided with ports connected to a conduit 214 leading to the return conduit 212, the latter conduit being connected to the reservoir or tank 188 for return of the pressuring fluid thereto. The conduit 139 of the actuator or cylinder 138 is connected to a port in the valve casing 207 which is between the valve members 209, 210 when the latter are positioned as shown in Fig. 15, while the conduit 140 is connected with a port in the valve casing to the rear of the valve member 210 when the latter is positioned as shown.

An arm 215, see Fig. 2, has its lower end pivoted to the supporting plate 199 adjacent to, and at one side, of cam shaft 200. This arm 215, intermediate its ends, is provided with a cam following roller 216 which bears upon the periphery of one of the cams 202 being held in engagement therewith by a suitable spring not shown. The upper end of this arm 215 is pivotally connected to one end of a bar 217, the latter being connected intermediate its ends with a rod 218 which is connected with the armature of an electromagnet 219. The armature of this electromagnet is normally urged upwardly as shown in Fig. 2 by a spring, not shown, and is retracted against the action of this spring when energized. The free end 220 of the bar 217 has an arcuate configuration for cooperation with a roller 221 provided on the outer end of the actuating rod 208 of the valve 197 it being understood that the valve 197 is mounted so that its rod 208 is in substantially the same vertical plane as the bar 217 when the latter is moved to its lower position by energization of the electromagnet 219. An abutment member 222, mounted on the plate 199, limits the upward movement of the bar 217 when the electromagnet 219 is deenergized.

The construction just described is such that, rotation of the cam shaft 200 causes the arm 215 to be rocked by cooperation of the roller 216 with the cam 202. This rocking action is, however, ineffective to operate the valve 197 unless the electromagnet 219 is energized since the bar 217 is normally disposed out of the path of the roller 221 by the action of the spring within the electromagnet 219. When the electromagnet 219 is energized, however, the armature thereof moves the rod 218 downwardly, as viewed in Fig. 2, thus bringing the bar 217 into alignment with the actuating rod 208 of the valve 197. Consequently, when the arm 215 is now rocked by the cam 202, the rod 217 is moved longitudinally and its arcuate portion 220 engages the roller 221 moving the valve rod 208 inwardly against the action of the spring 211. This causes fluid under pressure to flow from the supply conduit 193 through the conduit 213, and through the casing 207 of valve 197 intermediate the valve members 209, 210 which have now been moved so that the space between these valve members is in communication with the conduit 140, the communication of this space with conduit 139 having been terminated by this movement. Fluid under pressure, therefore, flows into the cylinder 138 behind the piston therein moving the latter forward and consequently moving the attached pusher plate 137 towards the platform 22. Any fluid in the cylinder 138 in advance of the piston is exhausted through the conduits 139 and 214 to return pipe 212 since the valve member 209 has been moved to place the conduits 139 and 214 in communication through the forward portion of the casing 207.

As the cam 202 continues to rotate, the bar 217 is rocked in the opposite direction since its roller 216 follows the cam under the action of a spring, not shown, so that the spring 211 can now move the rod 208 of the valve back to its position as shown in Fig. 15. This results in establishing communication from the conduit 193 through the conduit 213 and the space between the valve members 209, 210 to the conduit 139 so that fluid under pressure is now introduced into cylinder 138 in advance of the piston therein moving the latter back to its initial position thereby moving the attached pusher plate 137 to its initial position. During this reverse movement the fluid in the rear of the cylinder 138 is exhausted through the conduit 140, and through the portion of the housing 207 at the rear of the valve member 210, to the conduit 214 from which it flows to the fluid return conduit 212 and thence to the tank or reservoir 188. The valve 197 is repeatedly actuated in this manner so long as the electromagnet 219 remains energized.

As previously mentioned, each of the valves controlling operation of the feeder, pusher and ejector members is constructed in the same manner as that just described for valve 197 and is operated in the same manner under control of a separate cam similar to the cam 202. The cams for operating the feeler plates for the magazines 24 and 71 are positioned in substantially the same angular relationship upon the cam shaft 200, while the cams for operating the feeler plates of the magazines 56 and 92 are substantially aligned with each other but are disposed angularly 180° with respect to the cams for operating the feeder plates of the magazines 24 and 71. This is due to the fact that the valves for controlling operation of the actuators 38 and 88 for the feeders of the magazines 24 and 71, respectively, are located on the same side of the cam shaft 200, while the valves for controlling the operation of the actuators 67 and 94 for operation of the feeder plate magazines 56 and 92 are aligned on the opposite side of the cam shaft 200. Therefore, the several feeder plates are actuated substantially simultaneously for effecting feeding of a regular negative battery plate and a separator onto the receiving trough 102, and a postive battery plate and separator onto the receiving trough 136, this simultaneous feeding being permitted since, as mentioned before, the bottoms of the magazines 24 and 71 are vertically spaced and the bottoms of the magazines 56 and 92 are likewise vertically spaced.

The cams for actuating the valves controlling operation of the actuators 113 and 138 are identical and are angularly disposed upon the cam shaft 200 substantially 180° with respect to each other so that the pusher plates 109 and 137 are operated substantially simultaneously for moving the fed plates and separators onto the platform 22 it being remembered that the receiving trough 136 is at a slightly higher elevation than the receiving trough 102. These cams for controlling the operation of the actuators for the pusher members are so disposed that the said pusher members are moved shortly after the plates and separators have been fed onto the receiving troughs. The cam for actuating the valve controlling operation of the ejecting cylinder 164 is so positioned upon the cam shaft 200 that it operates the valve after the pusher members 109 and 137 have been returned to their initial positions and before the feeder plates are again actuated, it being understood that the valve controlling operation of the ejector cylinder 164 is not, however, operated each time that the pusher plates and feeder plates are operated but only after a complete element has been assembled. This is possible, as will hereinafter appear, by virtue of an electrical circuit interconnecting the several electromagnets such as 219 which, together with the cams such as 202, control operation of the valves.

The speed of movement of each feeder plate, pusher member, and the ejector member are individually controllable by means of separately manually adjustable valves interposed in one of the conduits connecting the fluid pressure actuator for the movable member with its valve. For example, as shown in Fig. 15, a manually adjustable valve 223 is interposed in the conduit 140 which connects the cylinder or actuator 138 with its valve 197, and a corresponding manually adjustable valve is provided in one of the conduits leading to each of the other cylinders or actuators 38, 67, 88, 94, 113 and 164, respectively. These valves 223 permit regulation of the rate of application of fluid under pressure to, and exhaust the fluid from, the cylinders or actuators thereby regulating the rate of movement of the piston therein and hence of the movable member connected thereto.

As previously mentioned, operation of the machine is under control of an electrical circuit which is effective to operate the several parts of the mechanism in predetermined sequence and is selectively conditionable to cause the machine to either repeatedly automatically assemble battery elements or to automatically terminate its operation after a single element has been assembled. In addition, the circuit is provided with a means for conditioning the apparatus to assemble elements of different sizes and to either assemble elements which have special negative plates on the outer sides thereof or to assemble elements having all of the negative plates of the same type. Furthermore, the circuit contains provisions for permitting operation of the several parts thereof under manual control.

The manually operated control switches for selecting these various modes of operation comprise a start switch and a stop switch 224, 225, respectively, of the push button type, located in a control box upon the top 21 of the frame of the machine, and a three-position, turn type switch 226 which is likewise mounted in the control box on the top 21 of the frame and is effective to condition the machine to either repeatedly automatically assemble elements or to stop after one element has been assembled. The other manually operated control switches are provided in a control box, not shown, the switches being schematically illustrated, however, in Figs. 16 and 16a which taken together, illustrate the electrical circuit for the machine. As illustrated therein, these other manually operated switches include a main line circuit breaker 227, a toggle-type switch 228 for selecting either manual or automatic operation, a selector switch 229 movable to condition the device for assembling elements having different numbers of plates, and a toggle switch 230 for effecting operation of the machine either to assemble elements having the negative plates thereof all alike or elements having the end negative plates different from the other negative plates therein. In addition to these switches, the control box includes manually operable switches 231, 232, 233, 234, 235, 236, 237 and 238 which individually control the operation of the feeder, pusher and ejector members of the machine when manual actuation thereof is to be effected. The connections of these switches and of the other electrical units in the circuit together with their mode of operatiton will be more readily understood in conjunction with a description of the operation of a machine for effecting the several operations thereof.

Let it be assumed that an eleven-plate element is to be assembled automatically, all of the negative plates of which are to be alike and that the machine is then to stop after this single element has been assembled. The operator will provide supplies of negative battery plates and positive battery plates in the magazines 24 and 56, a supply of separators with their ribs directed upwardly in the magazine 71 and a supply of separators with their ribs directed downwardly in the magazine 92. He then sets the switch 228 to its automatic position, as shown in Fig. 16. The switch 230 is set to the position for "end negative out" which is its position as shown in Fig. 16, switch 226 is set to the position illustrated in Fig. 16a, the switches 231 to 238 are placed in open positions and the selector switch 229 is moved to place its several contacts in engagement with the vertical row of contacts designated 11 in Fig. 16 and which corresponds to an eleven-plate element.

The circuit breaker 227 is then closed. This completes a circuit from a source of three-phase alternating current, indicated by the wires L1, L2 and L3, to the wires 239, 240 and 241 on the machine side of the circuit breaker. This energizes the pump motor 190 placing the latter in operation so that fluid under pressure is supplied to the conduit 193. The wires 239 and 240 are also connected with the motor 201 so that the latter is energized effecting rotation of the cam shaft 200. Operation of the latter motor does not, however, effect any movement of the feeder, pusher or ejector members since the electromagnets such as 219 are not now energized. The wires 239 and 240 are also connected with the primary of a transformer 242 the secondary of which supplies current for the control circuit, one terminal of this secondary being grounded and the other terminal being connected by a wire 243 to the movable blade of switch 228.

The machine is then started by momentarily depressing the start button 224. This supplies current from the wire 243 through switch 228 and wire 244 to a movable contact 245 of a switch 246. The contact 245 is at this time in engagement with a stationary contact which is connected by a wire 247 to a stationary contact 248, the latter being in engagement with one movable contact 249 of the switch 226 due to the initial setting of the latter. Current therefore flows through the movable contact 249 to a second stationary contact 250 of the switch 226 and through a wire 251, connected therewith, to and through the start switch 224 to a wire 252 which is connected to a stationary contact of that switch. The wire 252 conducts the current to one terminal of a coil 253 of a relay, generally designated 254, the other terminal of which is grounded. Consequently, coil 253 is energized moving its normally open contacts 254a and 254b to circuit closing positions and its normally closed contacts 254c and 254d to circuit opening positions. Closing of the contact 254a provides a holding circuit for relay 254, which circuit extends through the wire 247, wire 255 and the upper, normally closed contact 225a of the stop switch 225, the holding circuit continuing through a wire 256 and the now closed contact 254a of relay 254 to the wire 252 which it will be remembered is connected to the coil 253 of the relay. Consequently, the relay 254 is now held energized after the start button 225 is released.

As the motor 201 rotates the cam 203 thereon closes the contacts of the switch 206, the cam 203 having a configuration such that the switch 206 is held closed for the duration of time necessary to govern operation of all eight of the cams 202, which is approximately 120° of one revolution. Closing of switch 206 supplies current from the contact 245 of switch 246 through a wire 257 and through the now closed contact 254b of relay 254 to a wire 258, and thence through wires 259, 260 and 261 to and through the switch 206 to a wire 262, the latter being connected to one terminal of coil 263 of a stepping relay, generally designated 264, the other terminal of which is connected to the ground. Consequently, the coil 263 is now energized moving its armature upwardly as shown in Fig. 16. This armature is provided with a pawl engaging the teeth of a ratchet wheel 265 connected to a shaft 266, one end of which shaft carries a movable contact member or arm 267 adapted to move over a plurality of contacts 268a, 268b, etc. The shaft 266 is further provided with a coil spring 269 tending to rotate the shaft in a direction reverse to that in which it is stepped by operation of the coil 263, the shaft also being provided with a second ratchet wheel 270 cooperating with a pawl 271 to prevent rotation of the shaft in the direction in which it is urged by the spring 269. The pawl 271 is a part of, or is connected with, the armature of a coil 272. The coil 272 is adapted to be energized at the end of an element assembling operation and thereby withdraw the pawl 271 from engagement with the ratchet wheel 270 so that the shaft 266 and the contact arm 267 are returned to their initial positions.

The energization of the coil 263 causes a contact 273 carried thereby to move to circuit closing position thereby closing a circuit from the wire 261 to a wire 274 which is connected with the movable contact arm 267 of the stepping relay 264 and which movable contact is now in engagement with the contact 268a. Current therefore now flows from the contact 268a through a wire 275 and a wire 276 to a stationary contact 229e6 of the selector switch 229 and therefrom through a wire 277 to a movable contact 230b of the switch 230. The contact 230b is connected by a wire 279 to a stationary contact of the switch 230 which is now in engagement with the movable contact 230a of the switch 230 as the result of the initial setting of the latter. A wire 280 extends from the contact 230a to one terminal of a coil 281 of a latching relay 282, the other terminal of this coil being grounded. The initial setting of switch 230 has also placed its movable contact 230b in engagement with the stationary contact thereof which is connected by a wire 284 to one terminal of a coil 285 of a latching relay, generally designated 286, the other terminal of the coil being grounded. Consequently, the coils 281 and 285 are now energized.

Energization of coil 281 closes its normally open contacts 282a and 282b and opens its normally closed contacts 282c and 282d since these contacts are mounted to move together. The contacts are latched in these positions by engagement of one of the contacts or a member attached to the armature of the relay with a latching pawl 282e which is pivotally mounted and normally urged into latching engagement by a coil spring 282f. This pawl forms a part of the armature for a latch release coil 282g which is energized as hereinafter described to release the latch and thus allow the contacts 282a, 282b, 282c and 282d to return to their initial positions. The latching relay 282, comprising the coils 281, 282g, the latch and the contacts, is a conventional form of latching relay switch readily available on the market, the parts here being schematically illustrated in detail solely for the purpose of explaining the operation in the circuit.

The previously described circuit through the coil 285 likewise energizes this coil causing it to close its normally open contacts 286a, 286b, 286c and 286d the contacts being held in closed position by a latch 286e under control of the latch release coil 286g as in the case of relay 282.

Operation of the relay 286 now completes a circuit from the transformer 242 through the wire 243, switch 228, wire 244, contact 245 and wire 257 to the now closed contact 254b and from the latter through the wires 258, 259, 260 and 261 to a wire 287 connected with a stationary contact which is engaged by the now closed movable contact 282a of relay 282. This circuit continues through contact 282a through a wire 288 to one terminal of an electromagnet 289 the other terminal of which is grounded. This electromagnet 289 is identical with the previously described electromagnet 219 and operates, when energized, to bring an actuating bar, similar to that designated 217, into position for actuation of the valve for controlling the flow of fluid under pressure to the cylinder 38. Consequently, as the cam shaft 200 rotates, one of the cams 202 thereon operates this pusher bar to move the valve in a manner which supplies fluid pressure to the cylinder 38 through the conduit 43. This causes the negative battery plate feeder 36 to be moved below the magazine 24 feeding the lowermost negative battery plate contained therein onto the collecting trough 102. As the cam further rotates, the valve is then operated in the opposite direction to supply fluid under pressure through the pipe 44 to the cylinder 38, and exhaust the fluid then present on the opposite side of the piston in the cylinder through the conduit 43. Hence, the feeder member 36 is retracted in preparation for a new operation.

Substantially simultaneously, a separator is fed from the magazine 71 by operation of its feeder plate 84. This results from the fact that current is supplied from the wire 259, of the previously mentioned circuit, through the now closed contact 286d of relay 286 and through a wire 290 to one terminal of the electromagnet 291, the other terminal of which is grounded. Consequently, this electromagnet, which controls operation of the valve for the feeding mechanism of magazine 71 is energized so that rotation of the cam shaft effects operation of the valve thereby supplying fluid under pressure to the cylinder 88 in the direction which causes the feeder plate 84 to move a separator from the magazine 71 and onto the collecting trough 102. The continued rotation of the cam shaft causes this valve to be operated in the reverse direction thereby supplying fluid under pressure to move the feeder plate back to its initial position. Although this separator is fed substantially simultaneously with the feeding of a negative battery plate it does not cause any interference with the feeding of the latter since the magazines 24 and 71 are at different vertical elevations so that the separator comes to rest upon the negative plate and both upon the receiving trough 102.

Substantially simultaneously with the energization of the electromagnets 289 and 291, an electromagnet 292 is energized for effecting operation of the valve controlling feeding of a positive plate from the magazine 56. The circuit for thus energizing the electromagnet 292 extends from the wire 259 through the now closed contacts 286a of relay 286, and through a wire 293 to one terminal of the electromagnet 292, the other terminal of the electromagnet being grounded. Consequently, a positive battery plate is fed onto the receiving trough 136 in the same manner and at the same time as the feeding of the negative battery plate and the cooperating separator.

Likewise, a separator is fed from the magazine 92 substantially simultaneously with the feeding of the previously mentioned plates and separator since the electromagnet 294, which controls the valve for supplying fluid under pressure to the cylinder 94 for actuating the positive separator feeder, has been energized by the energization of the relay 286. This circuit extends from the wire 259 through the now closed contact 286b and a wire 295 to one terminal of the electromagnet 294, the other terminal of which is grounded. The magazine for the positive separators, being at a slightly higher elevation than the magazine for the positive plates, enables a positive plate and separator to be fed substantially simultaneously without interference, the separator coming to rest upon the positive plate and both resting upon the surface of the feeding trough 136.

The energization of the relay 282 has also provided a circuit through the now closed contacts 282b and through wires 296 and 297 to one terminal of an electromagnet 298, the other terminal of which is grounded. Energization of the electromagnet 298 moves the corresponding actuating bar, which is similar to that designated 217 into position for operating the cooperating valve. The cam for effecting operation of this bar and hence the valve is, however, so angularly disposed upon the cam shaft 200 that the bar does not operate the valve until shortly after feeding of the plates and separators to the collecting trough has been completed. However, when the cam does operate the valve controlling the flow of pressuring fluid to the cylinder 113, fluid pressure is now supplied through the conduit 118 thereby actuating the pusher 109 in the direction which moves the negative battery plate and separator over the collecting trough 102 and onto the top of the platform 22, it being remembered that the fingers 121 are in raised position at this time thus allowing passage of the plate and separator. Continued rotation of the cam shaft 200 causes the valve associated with the cylinder 113 to then supply fluid pressure to the cylinder through the conduit 119 thus moving the pusher 109 back to its initial position.

The energization of the relay 286 has also completed a circuit through its now closed contacts 286c to a wire 299 which is connected with one terminal of the electromagnet 219, the other terminal of which is grounded. Consequently, the electromagnet 219 is energized operating the associated bar 217 into the path of the actuating rod for the valve 197. Hence as cam 202 rotates it causes the valve 197 to supply fluid under pressure to the cylinder 138 through the conduit 140 substantially simultaneously with actuation of the pusher 109. Therefore the pusher 137 is actuated to move the positive plate and separator over the surface of the receiving trough 136 and onto the platform 22, the fingers 141 being raised at this time to permit passage of the plate and separator. It will be remembered that the receiving trough 102 is at a slightly lower elevation than receiving trough 136 so that the negative battery plate and separator on the former are delivered onto the platform 22 substantially simultaneously with the delivery of the positive battery plate and the separator from the trough 136, the positive plate coming to rest upon the upper surface of the separator which is upon the negative plate so that a "book" of plates and separators is now positioned upon the platform 22. As the respective pusher members 109, 137 have reached their forwardmost positions in the previously mentioned delivery of the plates and separators to the platform, they have actuated the fingers 121 and 141 back to their lowermost positions so that the subsequent withdrawal of the pusher members does not result in any displacement of the battery plates or separators from the top of the platform 22.

Adjacent the forwardmost position of the pusher member 137 the cam 154, disposed therebelow, engages the roller 153 from the actuating rod 151 moving the latter downwardly and thus rocking the actuating bar 149 in a downward direction against the force of spring 156. This causes the pawl 148 to move the platform 22 vertically downwardly a distance equal to the space of one of the ratchet teeth 145, so that the platform is now disposed at an elevation for receiving a succeeding book of plates and separators. As the positive pusher 137 returns to its initial position, the spring 156 moves the rod 151 and the actuating bar 149 back to their initial positions, the pawl 148 latching idly over the next succeeding tooth of the ratchet teeth 145. The platform 22 does not, however, move upwardly at this time since the retaining pawl 155 is in engagement with one of the ratchet teeth 144 so that the platform is held in its new position.

The above described operations have been completed during one rotation of the cam shaft 200 and consequently, the cam 203 has now moved to a position allowing separation of the contacts of switch 206. This deenergizes the coil 263 of the stepping relay 264 so that the pawl of the latter drops in preparation for a new actuation of the ratchet wheel 265, the contact arm 267 remaining in engagement with the contact 268a by virtue of the engagement of pawl 271 with the ratchet wheel 270. While the circuits to the coils 281 and 285 are now broken at the contact 273, the contacts of the relays 282 and 286 do not return to their initial positions since it will be remembered that these relays are of the latching type and their contacts are therefore held in the positions previously described.

As the cam shaft 200 continues to rotate, the cam 203 again closes the switch 206. This again energizes the coil 263 of the stepping relay 264 causing the pawl to move the ratchet wheel 265 a distance of an additional tooth and thereby moving the contact arm 267 from engagement with the contact 268a and into engagement with the contact 268b. This does not complete a circuit at this time due to the initial setting of switch 230. Nevertheless, since the contacts of relays 282 and 286 remain latched the previously described circuits therethrough remain closed so that the electromagnets 219, 289, 291, 292, 294 and 293 remain energized. Hence, as the cam shaft 200 continues to rotate the cams thereon actuate the associated valves 197 as before so that a negative battery plate is fed from the magazine 24, a separator is fed from the magazine 71, a positive battery plate is fed from the magazine 56 and a separator is fed from the magazine 92, and these plates and separators are then delivered onto the platform 22, the newly delivered plates and separators coming to rest upon the previously delivered plates and separators on the platform. The platform 22 is again stepped downwardly, as previously described, and these operations are repeated as the cam 200 continues to rotate, one complete "book," comprising a negative battery plate, a separator, a positive battery plate and a separator, being delivered to the platform for each rotation of the cam shaft 200.

When the movable contact arm 267 has thus been stepped around into engagement with stationary contact 268f of the stepping relay 264, current is now supplied therethrough and through a wire 300 to the contact 229f1 of the selector switch 229. This contact is strapped with contact 229e2 of the switch and, since the selector switch 229 was initially set for an eleven plate element, the movable contact 229m2 is in egagement with the contact 229e2. Hence, a circuit is completed through wires 301, 302 and 303 to one terminal of the latch release coil 286g of relay 286, the other terminal of this coil being grounded. Consequently, the relay coil 286g is energized attracting the latch 286e, thus releasing the contacts 286a, 286b, 286c and 286d which move to their positions as indicated in Fig. 16 because the coil 285 of the relay has been deenergized since the time that the movable contact 267 of stepping relay 264 left the contact 268a.

Opening of the contacts 286a, 286b, 286c and 286d deenergizes the electromagnets 292, 294, 219 and 291, respectively, so that the positive battery plate feeder and the feeders for each of the separators, as well as the pusher 137, cannot be actuated during the next rotation of the cam shaft 200. The contacts of the latching relay 282, however, are retained in their latched position during this rotation of the cam shaft and, consequently, the electromagnet 289 remains energized, as before described, so that the feeder for the magazine 24 is operated during this rotation of the cam shaft to feed a negative battery plate onto the receiving trough 102. Likewise, the electromagnet 291 remains energized through the previously described circuit during this rotation of the cam shaft so that the pusher plate 109 delivers the fed negative battery plate onto the top of the other plates and separators on the platform 22. The negative battery plate thus fed and delivered is the final plate for the assembly upon the platform.

The next rotation of the cam shaft 200 again results in a closing of the switch 206 thereby reenergizing the coil 263 and effecting movement of the contact arm 267 one step and into engagement with contact 268g. This completes a circuit through a wire 304 to contact 229g1 of the plate selector switch 229, which contact is strapped to contact 229e3 of that switch. The initial positioning of the selector switch 229 has placed the movable contact 229m3 in engagement with the contact 229e3 so that the circuit from the contact 268g extends through the contacts just mentioned of switch 229, and through a wire 305 to one terminal of a coil 306 of a latching type relay, generally designated 307, the other terminal of the coil 306 being grounded. The latching relay 307 is similar to the previously described relays 282, 286 and comprises movable contacts 307a, 307b, 307c, 307d. These contacts are moved from normally open positions to circuit closing positions when the coil 306 is energized and are held in their circuit closing positions by a latch 307e until the latch release coil 307g is subsequently energized during operation of the machine.

Closing of the contact 307d completes a circuit energizing an electromagnet 308 controlling operation of the assembly ejector member 162.

This circuit extends from the transformer 242 through the wire 243, switch 228, wires 244 and 257, the now closed contact 254b of relay 254, wires 258, 259, 260, 261, and a wire 309 to the contact 307d, thence through a wire 310 to one terminal of the electromagnet 308, the other terminal of which is grounded. The electromagnet 308 governs the operation of the valve for controlling application of fluid pressure to the ejecting cylinder 164 so that, when the corresponding cam upon the cam shaft 200 has rotated to the proper position, the valve is actuated to supply fluid under pressure through the conduit 166 to the cylinder 164. This causes the ejector plate 162 to move forwardly over the lowered platform 22 thereby moving the assembled element E therefrom onto the tablelike surface 161 from which it may be removed by the operator, when convenient, the edges of the plates in the assembled element being aligned with each other or "evened" upon the surface 185, if necessary. The assembled element may then be transferred to mechanism, not shown, for burning the connecting straps onto the plates and for effecting the final assembly of the element into a completed battery.

As heretofore previously described in detail, movement of the ejector plate 162 forwardly over the platform 22 prepares a latch release mechanism for operation to release the pawls which operate the platform 22. When the ejector plate 162 returns to its initial position, this release mechanism is actuated to release the pawls of the platform operating mechanism so that the platform returns to its initial upper position, the pawl mechanism being reset adjacent the upper position of the platform and thus prepared to again sequentially move the platform downwardly as a new element is assembled thereon.

Closing of the contact 307d also completed a circuit through a wire 311 which is connected to the wire 310 and to one terminal of the coil 272, the other terminal of which is grounded. Coil 272 is therefore energized withdrawing the pawl 271 from engagement with the ratchet wheel 270. Consequently, the shaft 266 is rotated by the spring 269 thereby returning the contact arm 267 to its initial position indicated in Fig. 16. This breaks the circuit for the coil 306 but the contacts of the relay 307 do not return to their initial positions at this time since they are held operated by the latch 307e.

Closing of the contact 307c completes a circuit from the wire 257 through a wire 312, and the contact 307c, to a wire 313 connected with one terminal of a synchronous electric motor 314, the other terminal of which is grounded. This synchronous motor 314 may be of any desired type but conveniently is similar to those employed for operating electrical clocks and the shaft thereof is connected through a suitable gearing to operate a contact actuating arm 315. The outer end of the contact actuating arm 315 has a suitably shaped cam portion 316 for engaging an actuating button 317 upon the movable arm 245 of the switch 246. Consequently, the motor 314 is placed in operation and during its rotation breaks the circuit between the wire 247 and the movable contact 245. Opening of the circuit between the contact 245 and the wire 247 breaks the holding circuit for the coil 253 of relay 254 which holding circuit extends through the stop switch 225 and the contacts 254a of relay 254. Opening of the contact 254b breaks the circuit through wires 258, 259, 260 and 261 thus deenergizing coil 272 and electromagnet 308. Hence, the pawl 271 drops back into engagement with the ratchet wheel 270 and further operation of the ejector is prevented. The circuit to the synchronous motor 314 is not broken, however. Consequently, it continues in rotation.

Substantially simultaneously with the opening of the circuit between contact 245 and the wire 247, the cam 316 moves the contact 245 into circuit closing relationship with a wire 318 thus completing a circuit therethrough to the now closed contact 307a and from the latter through a wire 319 to one terminal of the latch release coil 307g, the other terminal of which is grounded. Consequently, the latch 307e is released from its holding position so that the contacts 307a, 307b, 307c and 307d now move to their open positions. Movement of the contact 307c to its open position breaks the circuit to the synchronous motor 314 so that the latter is stopped. It will be understood, however, that the cam 316 is so shaped, and the residual rotation of the motor 314 after its energization is terminated is such, that the cam 316 has moved from engagement with the actuating button 317 when the motor is at rest. Hence, the movable arm 245 of switch 246 is again in circuit closing relationship with the wire 247 and the circuit is restored to its condition as shown in Figs. 16 and 16a except that the circuit breaker 227 remains closed. A new cycle of operation is not, however, automatically initiated at this time since, as mentioned before, the relay 254 has been deenergized. A new element may, however, be assembled by again pressing the start button 224 and the cycle of operations is completed as before.

The switch 226 is provided with a second movable, normally open contact 320 and the switch actuator 321 is such that in one position only the contact 249 is in circuit closing position, in a second position of the actuator both contacts 249 and 320 are in circuit closing position, and in a third position both of the contacts 249 and 320 are in open position. As shown in Fig. 16a the actuator 321 is positioned so that contact 249 is closed and contact 320 is opened. This corresponds to the position of the switch for effecting assembly of a single element by the machine and automatically stopping thereof after a single element has been assembled and removed from the platform. If, however, it be desired to repeatedly assemble elements without the necessity of actuating the start button 224 for each element to be assembled, the actuator 321 of switch 226 is then positioned so that the contacts 249 and 320 are both in circuit closing positions.

Operation of the machine for automatically repeatedly assembling battery elements is initially begun by pressing the start button 224, as before. The operation of the assembling of a single element continues to completion as previously described which element is then ejected from the platform 22. However, breaking of the circuit between the movable contact 245 and the wire 247 by the rotation of the motor 314 does not now deenergize relay 254 since the setting of the switch 226 has now provided another circuit for the coil 253 thereof. This circuit extends from wire 243 through wire 244, a wire 322 to and through the now closed contact 320, thence through a wire 323, the closed contact 249 and the wire 255, the closed contact 225a, wire 256, closed contact 254a, and the wire 252 connected to the coil 253 of relay 254. Consequently, the holding circuit for this relay is not broken by the rotation of the motor 314. The release of the contacts of relay 307, however, otherwise prepares the circuit as before for a new element assembling operation which is automatically initiated as the cam shaft 200 continues to rotate since the cam 203 again closes switch 206 operating the stepping relay 264 and thereby moving the arm 267 into engagement with a contact 268a. The operations of the apparatus are then automatically repeated in the same manner as previously described and may be continued indefinitely it being understood that the operator of the machine continuously supplies battery plates and separators to the respective magazines as needed and this supplying of plates and separators does not interfere with the continuous operation of the machine.

When the operator desires to stop the machine, this may be effected by momentarily depressing the stop button 225. This opens the circuit through the contacts 225a, breaking the circuit to the relay 254 thus deenergizing the latter and thereby preventing operation of the several feeders, pushers and ejector members. Actuation of the stop button 225 has also moved a second contact 324 thereof into circuit closing position thus completing a circuit from the transformer 242 through the wire 243, switch 228, wires 244, 322 and 325 to and through contact 324 to a wire 326 which is connected to one terminal of the coil 272 the other terminal of which is grounded, as previously mentioned. Consequently, the pawl 271 is released from the ratchet wheel 270 and the stepping relay 264 is returned to its initial position. The circuit is therefore returned to the condition in which it is ready to begin a new operation.

If it be desired to assemble an element or elements having special end negative plates, the apparatus is initially prepared for this operation by setting the toggle switch 230 to its opposite position from that shown in Fig. 16. This setting of the switch 230 which so conditions the circuit that in the first cycle of the operation of the machine a negative plate is not fed from the magazine 24. Consequently, this first plate, which is of the special type, must be supplied by the operator and this may be effected by either directly placing such a plate upon the receiving trough 102 before beginning operation of the machine or by manually actuating the feeder mechanism for the magazine 97 and the pusher 109, as hereinafter described. This operation of manually supplying a special negative plate is necessary only when initially beginning such operations and is not required thereafter since the machine will automatically supply such a plate to the receiving trough 102 as it complete the assembly of an element so that this first special negative plate is in position for the next succeeding element. The machine may be either automatically continuously operated for repeatedly assembling elements having the special end negatives or may terminate its operation after one such element has been assembled in accordance with the setting of the switch 226 as previously described.

Assuming that this switch 226 has been set for continuous operation of the machine and that the end negative switch 230 has been set as previously mentioned and, further, that switch 228 is in its automatic position, operation of the machine is commenced, as before, by depressing start button 224. This energizes the relay 254 closing its contacts 254a and 254b and opening its contacts 254c and 254d. Closing the contact 254a provides a holding circuit for the relay 254 while closing of the contact 254b completes a circuit to the wire 261 so that, as the cam shaft 200 rotates thereby closing the switch 206, the stepping relay 264 is energized moving its contact arm 267 into engagement with contact 268a. This completes a circuit through the wires 275, 276 and 277 to the movable contact 230b of switch 230. This contact 230b of switch 230 is now in circuit closing relationship with a wire 327 connected to the previously mentioned wire 284 so that the coil 285 of relay 286 is energized moving the contacts of this relay to circuit closing position in which position they are retained by the latch 286e.

Operation of the relay 286 closes the previously described circuits for the electromagnets controlling operation of the feeders for the magazines 56, 71 and 92 so that rotation of the cam shaft effects operation of these feeders. Consequently, a positive plate and a separator are deposited on the receiving trough 136 and a separator is delivered on top of the special negative plate previously placed in the receiving trough 102. Likewise, the pusher member 137 is rendered operative by the operation of the relay 286. At the same time that the pusher member 137 operates, the pusher 109 is also actuated since its electromagnet 298 is energized by a circuit extending through the now closed contact 286d, a wire 328, the closed contact 282d of relay 282 which it will be remembered has not yet been energized, a wire 329, the contact 282c, a wire 330, normally closed contact 331d of a latching relay 331, a wire 332, and through the normally closed contact 331c to the wire 297 thence to the electromagnet 298. Therefore, the special negative plate and the separator resting thereon are delivered to the platform 22 and at substantially the same time the positive plate and the separator resting thereon are also delivered to the platform 22 and come to rest on top of the negative plate and its separator.

Continued rotation of the cam shaft causes the second actuation of the switch 206 thereby stepping the contact arm 267 of relay 264 from contact 268a and into engagement with the contact 268b. This completes a circuit extending from the latter contact through wires 333 and 334 to the contact 229e5 which is strapped with contacts 229f5, 229g5, 229h5 and 229i5, the latter being connected by a wire 335 with a stationary contact 336 of the switch 230. Due to the initial positioning of the switch 230 the movable contact 230a thereof is now in engagement with the contact 336 so that a circuit is completed through movable contact 230a and the wire 280 to the coil 281 of relay 282 thereby energizing the latter and moving its contacts to operated positions. This operation of the relay 282 has effected opening of the contact 282d thus interrupting the previously mentioned circuit for the electromagnet 298, while the closing of the contact 282a closes a circuit for energization of electromagnet 289 and closing the contact 282b closes the circuit for the energization of the electromagnet 298. The contacts of relay 286 are held in their operated positions by the latch 282e and, since the electromagnets 289 and 298 control the operation of the feeder for magazine 24 and the pusher 109, respectively, the machine now operates as previously described to feed plates from the magazines 24 and 56, and separators from the magazine 71 and 92, respectively, and to deliver these onto the platform on top of the previously delivered plates and separators.

The operation then continues in the same manner as previously described, for the assembly of an element in which all the negative plates are alike, during succeeding rotations of the cam shaft 200 until the contact arm 267 engages stationary contact 268e. When this occurs a circuit is completed through a wire 337 to the stationary contact 229e1 of switch 229 with which the movable contact 229m1 is in engagement due to the initial setting of switch 229. This circuit further extends from the latter contact through a wire 338 to a stationary contact 339 of the switch 230. The initial positioning of the switch 230 has placed the movable contact 230d thereof in engagement with the contact 339 so that a circuit is now completed therethrough and a wire 340 to one terminal of the actuating coil 341 for the relay 331, the other terminal of this coil being grounded. Consequently, coil 341 is energized thereby moving the contacts 331a and 331b to circuit closing positions and contacts 331c and 331d to circuit opening positions, the contacts being latched in these positions by the latch 331e.

Closing of the contact 331a completes a circuit from the wire 261 through a wire 342 to one terminal of electromagnet 343, the other end of which is grounded. This electromagnet 343 moves an actuating bar, similar to the bar 217, into position for actuating a valve, similar to 197, which controls operation of the feeder 98 for feeding a special negative plate from the magazine 97. Hence, one of the plates within this magazine 97 is fed onto the rear portion of the pusher member 109 as the cam shaft is rotated to bring a cam thereof into operating relationship with this valve. Relays 282 and 286 still have their contacts latched in operated position at this time and therefore a plate and a separator are fed from the magazines 24 and 71, respectively, onto the receiving trough 102 in advance of the pusher 109 and a plate and separator are fed from magazines 56 and 92, respectively, onto the receiving trough 136 during this same rotation of the cam shaft. Likewise, the pushers 109 and 137 are actuated in proper timed relationship to move the plates and separators which are on the troughs 102 and 136 onto the other plates and separators on the platform 22. The movement of the pusher 109 also carries the special negative plate, which is resting thereon, forwardly until the latter is above the receiving trough 102. As pusher 109 is returned to its initial position the fingers 134 strip this special negative plate from the pusher and allow it to drop upon the receiving trough 102.

Continued rotation of the cam shaft 200 moves the contact arm 267 of relay 264 into engagement with the stationary contact 268f thereby closing the circuit to contact 229f1. Since contact 229f1 is strapped to contact 229e2, and since the movable contact 229m2 is in engagement with contact 229e2, a circuit is completed through the wire 301 to the wires 302 and 303 thus energizing the release coil 286g of relay 286. This releases the latch 286e allowing the contacts of relay 286 to return to their initial open positions. A circuit is also completed from a wire 301 through a wire 344 to a stationary contact 345 of the switch 230. The initial actuation of the switch 230 has moved the contact 230c thereof into engagement with the contact 345 so that a circuit is now completed through a wire 346 and a wire 347 to the release coil 282g of relay 282. The resulting energization of coil 282g withdraws the latch 282e from holding engagement with the contacts of the relay so that the latter return to their initial positions shown in Fig. 16. Consequently, the previously mentioned circuits through the contacts of the relays 282 and 286 are open so that the next rotation of the cam shaft does not effect operation of the feeders for the magazines 24, 56, 71 and 92 or movement of the pusher 137.

During the next rotation of the cam shaft, however, the feeder 98 for the special negative plate magazine 97 is again operated since the circuit for the electromagnet 343 which controls operation thereof remains closed through the contact 331a. Therefore, a special negative plate is fed from the magazine 97 onto the top of the pusher 109. A circuit is also completed through the contact 254b of relay 254, wires 258, 259, 260 and 261, to and through the now closed contact 331b and wire 297, thus energizing electromagnet 298 governing the operation of a pusher 109 so that as the cam shaft 200 now continues to rotate a cam thereof operates the valve for supplying fluid pressure to the cylinder 113 for moving the pusher 109. This causes the special negative plate which was deposited upon the receiving trough 102 during the preceding step in the operation to be delivered to the top of the plates and separators on the platform 22. This completes the assembly of the element which comprises special negative plates on the top and bottom thereof, the remaining negative plates of the element being of the usual type.

The movement of the pusher 109 which completed the element upon the platform also carried the special negative plate which was positioned upon the pusher forwardly until it was above the receiving trough 102. When the pusher 109 was retracted the fingers 134 stripped this special negative plate from the pusher allowing it to drop onto the trough 102 thus preparing the machine for assembly of a new element having special end negative plates. The special plate thus deposited in the trough 102 is the first or bottom plate in the new element, as will hereinafter appear, so that it is not necessary for the operator to thereafter manually provide a first special negative plate as he does when initially starting the operation.

After the element is completed as just described, the next rotation of the cam shaft 200 moves the contact arm 267 of stepping relay 214 into engagement with the stationary contact 268g thus completing a circuit through the wire 304 to the contact 229g1 which is strapped to the contact 229e3. Since the movable contact 229m3 is in engagement with the contact 229e3, a circuit is completed through the wire 305 for energizing coil 306 of the relay 307 thereby closing the contacts 307a, 307b, 307c and 307d. Closing of the contact 307b completes a circuit therethrough, and through a wire 348, to one terminal of the release coil 331g, the other terminal of which is grounded. Therefore, the latch 331e is moved to release the contacts of relay 331 so that the circuits through the latter to the electromagnets 298 and 343 are deenergized. Closing of the contact 307d completes a circuit for energizing electromagnet 308 so that, as the cam shaft 200 rotates, the ejector 162 is operated to move the assembled element from the platform 22 onto the table 161, the ejector in its movement operating the release mechanism for effecting return of the platform to its initial position as previously described. The closing of the contact 307d also energized coil 272 thereby retracting the pawl so that the stepping relay 264 returns to its initial position. This de-energizes coil 306 but the contacts 307a, 307b, 307c and 307d are held in operated position by the latch 307e.

Closing of the contact 307c completed a circuit therethrough energizing the motor 314, the rotation of which first moves the contact 245 to open the circuit therethrough to the wire 247. Relay 254 is not, however, deenergized at this time since it will be remembered that the machine was conditioned for automatically repeatedly assembling elements and hence the switch 226 was set so that both the contacts 249 and 320 are in circuit closing positions. Consequently, a holding circuit for relay 254 was provided through the wire 322, contact 320, wire 323, contact 249, wire 255, contact 225a, wire 256 and contact 254a. Closing of contact 307b completes a circuit therethrough and a wire 348 to the release coil 331g of relay 331. Hence, the pawl 331 is moved to release the contacts 331a, 331b, 331c and 331d which return to their initial positions. Finally, operation of the motor 314 closes a circuit between switch arm 245 and wire 318, this circuit being completed through the closed contact 307a, to energize the release coil 307g for relay 307. This releases the latch 307e so that the contacts 307a, 307b, 307c and 307d are moved to their open positions as shown in Fig. 16.

In view of the fact that the relay 254 remains energized, as previously mentioned, continued rotation of the cam shaft 200 again brings the contact arm 267 of stepping relay 264 into engagement with the stationary contact 268a. This operates as before described to energize coil 285 of relay 286 so that a separator is now fed from the magazine 71 on top of the special negative plate which was left resting upon the receiving trough 102 at the end of the previous cycle which completed the assembly of the preceding element. Likewise, a positive plate and a separator are fed from the magazines 56 and 92, respectively, and the pusher members 109 and 137 are operated to move the plates and separators onto the platform 22. Continued rotation of the cam shaft 200 then sequentially operates the mechanism as described before to complete the assembly of another element, removes the latter from the platform 22 and initiates the assembly of a new element, these operations continuing in predetermined sequence until the machine is stopped by actuation of the stop button 225.

As mentioned before, the switch 226 may be positioned so that both of its contacts 249 and 320 are in open positions. This corresponds with the idle position of the machine and is provided as a safety feature so that inadvertent operation of the start button 224 does not place the machine in operation.

The several operating parts of the machine may be actuated individually under manual control, if desired. This is effected by initially moving switch 228 from its automatic position, as shown in Fig. 16, to its manual position. In this latter position, the movable arm of the switch closes a circuit from the secondary of the transformer 242 to and through a wire 349 which is connected to the stationary contact of each of the switches 231 through 238, see Fig. 16a. The movable contacts of these switches 231 to 238 are respectively connected to the wires 290, 295, 297, 310, 342, 299, 288 and 293. Consequently, closing the switch 231 energizes the electromagnet 291 for governing the feeding of separators from the magazine 71 under control of the associated cam and valve. Closing switch 232 energizes the electromagnet 294 governing feeding of a separator from the magazine 92. Closing switch 233 energizes electromagnet 298 for governing the operation of the pusher 109. Closing switch 234 energizes electromagnet 308 for governing operation of the ejector. Closing switch 235 energizes electromagnet 343 governing feeding of special negative plates from the magazine 97. Closing switch 236 energizes electromagnet 218 governing operation of the pusher 137. Closing switch 237 energizes the electromagnet 289 governing operation of the feeder for the negative plates in the magazine 24, and closing switch 238 energizes electromagnet 292 governing the feeding of positive plates from the magazine 56.

Therefore, each operating part of the machine may be individually manually operated, it being remembered that operation of the pusher 137 results in effecting vertical movement of the platform 22 while operation of the ejector, when the platform is at its lowest position, effects return of the platform to its initial uppermost position. The previously mentioned supplying of a special end negative plate, when initially beginning assembly of elements having such plates, may be effected by placing the switch 228 in its manual position and then sequentially operating switches 235 and 233 thereby feeding the special negative plate onto the pusher 109 and moving the latter to deposit the fed plate upon the receiving trough 102. The switch 228 may then be restored to its automatic position and the machine placed in operation as previously described for automatically assembling elements having special end negative plates.

For simplicity, the machine has been described entirely with reference to assembling battery elements having eleven plates. It will be apparent, however, that the machine is capable of assembling battery elements or other articles having different numbers of plates by simply positioning the movable portion of the switch 229 in engagement with the vertical column of stationary contacts of that switch corresponding to the number of plates to be contained in the element. The circuit has been illustrated with the switch 229 wired so that elements having eleven, thirteen, fifteen, seventeen or nineteen plates may be assembled by simply thus positioning the movable portion of the switch 229. Furthermore, the switch 229 is illustrated as having additional stationary contacts which may be wired in a similar manner for assembling elements in which the number of plates is different from the values just mentioned.

It will be remembered that the platform 22 is moved vertically downward one step for each "book" of plates and separators delivered thereto, a "book" comprising a negative plate and separator, and a positive plate and separator. Consequently, when assembling an eleven-plate element the platform is stepped downwardly five times. If desired, sufficient ratchet teeth 144 and 145 may be provided upon the bar 143 so that the platform is moved vertically downwardly each time "books" of plates and separators are added thereto whether the elements assembled have eleven or a greater number of plates. This would result in the bottom of the ejector plate 162 being vertically spaced above the top surface of the platform 22 when the latter is in its lowermost position in the assembly of elements having plates in excess of eleven. In order for the ejector 162 to properly remove the elements from the platform 22, however, it is desirable that the lower edge of the ejector plate sweep across the top of the platform closely adjacent thereto. This may be effected by making the plate 162 adjustable relative to its actuator so that its vertical elevation may be altered in accordance with the size of the elements assembled. If this mode of operation is to be effected, then the table 161 upon which the elements are delivered by the ejector is either adjustable in height or is mounted so as to be substantially aligned with the top of the platform 22 when the latter is in its lowermost position after assembly thereon of the largest element the machine is capable of assembling.

It is not, however, necessary that the platform 22 have its upper surface closely adjacent the surface of the collecting trough 102 in its uppermost position since a slight drop of the plates and separators, when delivered to the platform 22, is not objectionable although a drop through the distance of the thickness of a complete element causes considerable trouble. Therefore, the number of ratchet teeth 144 and 145 need only be sufficient for effecting vertical downward movement of the platform 22 the number of times required to bring the top of the platform slightly below the lower edge of the ejector plate when an element of the smallest size has been assembled upon the platform. In other words, the platform will be moved downwardly the same number of times regardless of the number of plates in the element assembled thereon, and the initial upper position of the platform is either below the level of the collecting trough 102, and/or the distance the platform moves when actuated by the pawl 148, are such that, when the platform is in its lowermost position, the last plates and separators delivered to the platform for the largest element assembled thereon will not interfere with the previously delivered plates on the platform. More specifically, the platform 22 moves vertically downwardly five times when assembled elements have either eleven plates or a greater number of plates and always comes to rest with its upper surface adjacent the lower edge of the ejector plate 162 so that the latter and the receiving table 161 need not be adjustable. In such a construction the operation of the pusher 137 in delivering the sixth and succeeding positive plates and separators to the platform does not effect vertical downward movement of the platform. Instead, when the cam 154 now engages the roller 153 rocking the actuator 149 and the pawl 148, the pawl merely slides idly up and down over the untoothed portion of the surface of the bar 143 above the upper one of the teeth 145 thereon.

Either mode of operation of the platform 22 is satisfactory or other mechanisms for moving the platform in accordance with the delivery of plates and separators thereto may be employed if desired, so long as the vertical drop of the plates and separators when delivered from the collecting troughs to the platform is never excessive. Thus, mechanism may be employed which produces a continuous downward movement of the platform during the assembling of an element. Moreover, the machine may be so constructed that the negative plates and separators are delivered to the platform in advance of the positive plates and separator. In such a case the collecting troughs 102 and 136 could be the same height and the platform 22 moved downwardly either continuously or step-by-step each time a plate and separator is delivered thereto.

The magazines 24, 56, 71, 92 and 97 are preferably adjustable to accommodate plates and separators of different dimensions so that battery elements having plates and separators of different areas may be assembled. The adjustments of the magazines are the only adjustment of the machine necessary for adapting it to plates and separators of different sizes since the several hydraulic actuators have a length of stroke sufficient to effect proper movement of plates and separators of all known commercial sizes.

While an apparatus embodying the principles of this invention has been shown and described in considerable detail as a machine for assembling storage battery elements, it will be understood that this is only by way of illustration since the apparatus may be employed for assembling articles other than storage batteries. Moreover, numerous variations in the manner of construction and the mode of operation may be effected by those skilled in the art. Therefore, the invention is not to be considered as limited to the exact details herein illustrated and described.

Having thus described our invention, we claim:

1. An apparatus, for assembling storage battery elements from battery plates and plate separators, comprising a single non-rotatable vertically movable platform, separate magazines disposed at one side of said platform and adapted to respectively contain supplies of negative battery plates and plate separators, separate magazines disposed on another side of said platform and adapted to respectively contain supplies of positive battery plates and plate separators, means to feed a predetermined number of said plates and separators one at a time from said magazines and to stack all of the fed plates and separators upon said platform in a predetermined order, means to vertically move said platform in timed relationship with the stacking of the plates and separators thereon, means to remove the stacked plates and separators as a unit from said platform after the said predetermined number of plates and separators have been stacked thereon, and control means for effecting automatic operation of said feeding and removing means in a predetermined order.

2. An apparatus of the type defined in claim 1 and in which the said control means includes a manually settable selector for conditioning the control means to effect delivery of different predetermined numbers of plates and separators to said platform before said removing means is operated, whereby battery elements of different sizes may be readily assembled by varying the setting of said selector.

3. An apparatus of the type defined in claim 1 and in which said control means includes means to automatically terminate operation of said apparatus after a single battery element has been assembled.

4. An apparatus of the type defined in claim 1 and in which said control means includes means to effect repeated actuation of said feeding means and removing means in sequence to thereby continuously assemble battery elements.

5. An apparatus, for assembling storage battery elements from battery plates and separators, comprising a vertically movable platform, a member mounted for reciprocation transversely relative to said platform, separate magazines mounted adjacent opposite sides of said reciprocating member and adapted to respectively contain a supply of negative battery plates and plate separators, separate means to feed said plates and separators one at a time from said magazines into the path of said reciprocating member when the latter is in one position and with the fed separator resting upon the fed negative plate, means to reciprocate said member to thereby deliver the fed plate and separator to said platform, a second member mounted for reciprocation transversely relative to said platform, separate magazines mounted adjacent opposite sides of said second member and adapted to respectively contain supplies of positive battery plates and plate separators, separate means to feed said positive plates and separators one at a time from their magazines into the path of said second reciprocating member when the latter is in one position and with the fed separator resting upon the fed positive plate, means to reciprocate said second member to thereby deliver the fed positive plate and separator to said platform, and means to move said platform in a vertical direction in timed relation with the reciprocation of said first and second members, whereby the battery plates and separators are stacked on said platform in a manner to constitute a storage battery element.

6. An apparatus as defined in claim 5 and in which the several means for feeding plates and separators and the means for moving said first and second members each includes a separate fluid pressure operated actuator, means governing the application of fluid pressure to the several actuators, and means for operating said governing means in predetermined timed relationship.

7. An apparatus, for assembling storage battery elements from battery plates and separators, comprising a vertically movable platform, a member mounted for reciprocation transversely relative to said platform, separate magazines mounted adjacent opposite sides of said reciprocating member and adapted to respectively contain a supply of negative battery plates and plate separators, separate means to feed said plates and separators one at a time from said magazines into the path of said reciprocating member when the latter is in one position and with the fed separator resting upon the fed negative plate, means to reciprocate said member to thereby deliver the fed plate and separator to said platform, a second member mounted for reciprocation transversely relative to said platform, separate magazines mounted adjacent opposite sides of said second member and adapted to respectively contain supplies of positive battery plates and plate separators, separate means to feed said positive plates and separators one at a time from their magazines into the path of said second reciprocating member when the latter is in one position and with the fed separator resting upon the fed positive plate, means to reciprocate said second member to thereby deliver the fed positive plate and separator to said platform, means to move said platform in a vertical direction in timed relation with the reciprocation of said first and second members so that the battery plates and separators are stacked on said platform in a manner to constitute a storage battery element, means to remove a stacked element as a unit from said platform, and control means for effecting automatic operation of said feeding means, said means for moving the reciprocating members and the said removing means in a predetermined order; the said control means including a settable member selectively positionable to either effect automatic termination of the operation of said apparatus after a single element has been assembled, or to effect repeated actuation of said feeding means, said means for moving the reciprocating members and said removing means in sequence to thereby continuously assemble battery elements; the said control means further including a selector manually settable for conditioning the control means to effect feeding and delivery of different predetermined numbers of plates and separators to said platform before said removing means is operated so that battery elements of different sizes may be readily assembled by varying the setting of said selector.

8. An apparatus, for assembling storage battery elements from battery plates and separators, comprising a vertically movable platform, separate magazines adapted to respectively contain supplies of positive battery plates, plate separators, and regular negative plates, a separate magazine adapted to contain a supply of special negative battery plates, means to feed a predetermined number of said positive plates, plate separators and regular negative plates from said magazines and to deliver the fed plates and separators to said platform in the predetermined order which they occupy in the completed battery element, and means to effect feeding and delivery of special negative plates in place of the first and the last regular negative plates in the said predetermined number and order of plates and separators fed and delivered to said platform.

9. An apparatus, for assembling storage battery elements from battery plates and separators, comprising a vertically movable platform, separate magazines adapted to respectively contain a supply of positive battery plates, plate separators and regular negative battery plates, means to feed a predetermined number of said positive plates, separators, and regular negative plates from said magazines and to deliver the fed plates and separators to said platform, control means to effect the feeding and delivery of said plates and separators in predetermined sequence so that they are stacked upon said platform in the predetermined order which they occupy in a completed battery element, a separate magazine adapted to contain a supply of special negative battery plates, means operated by said control means to feed and deliver said special negative plates one at a time from the last-mentioned magazine and to said platform, and a manually operable means forming a part of said control means and adapted when set in one position to effect feeding and delivery of only said regular negative plates, positive plates and separators and when set in another position to effect feeding and delivery of one of said special negative plates in place of the first and the last regular negative plates in the said predetermined number and order of plates and separators delivered to said platform.

10. In an apparatus for assembling storage battery elements, the combination of separate magazines adapted to respectively contain supplies of positive battery plates, negative battery plates and plate separators, a feeding member associated with each of said magazines and adapted to feed a single plate or plate separator therefrom on each actuation thereof, a movable platform adjacent said magazines and adapted to receive the said plates and separators in stacked arrangement, fluid pressure operated means operatively connected with each of said members for effecting actuation thereof, a separate valve means for controlling the flow of fluid under pressure to each of said fluid pressure operated means, separate mehanically actuated means associated with each of said valves and positionable to and from actuating relationship with the corresponding valve, a separate electrically operated means operatively associated with each of said mechanically actuated means and adapted when energized to position the corresponding mechanically actuated means for operation of the corresponding valve, and electrical circuit means for selectively energizing said electrically operated means in predetermined order such that the fed plates and separators are disposed on said platform in the order which they occupy in a completed battery element.

11. In an apparatus for assembling storage battery elements, the combination of separate magazines adapted to respectively contain supplies of positive battery plates, negative battery plates and plate separators, a feeding member associated with each of said magazines and adapted to feed a single plate or plate separator therefrom upon each actuation thereof, a vertically movable platform, reciprocating members adapted to deliver fed plates and separators to said platform, fluid pressure operated means operatively connected with each of the said feeding and reciprocating members for effecting actuation thereof, a separate valve means for controlling the flow of fluid under pressure to each of said fluid pressure operated means, separate mechanically actuated means associated with each of said valves and positionable to and from actuated relationship with the corresponding valve, a separate electrically operated means operatively associated with each of said mechanically actuated means and adapted when energized to position the corresponding mechanically actuated means for operation of the corresponding valve, and electrical circuit means for selectively energizing said electrically operated means in predetermined order such that the fed plates and separators are disposed on said platform in the order which they occupy in a completed battery element.

12. An apparatus for assembling storage battery elements comprising separate magazines adapted to respectively contain supplies of negative battery plates, positive battery plates, ribbed plate separators with their ribs directed upwardly, and ribbed plate separators with their ribs directed downwardly, means to feed a single negative plate from its magazine, means to feed a single separator having ribs directed upwardly from its magazine and onto the top of the fed negative plate, means to feed a single positive plate from its magazine, means to feed a single separator having its ribs directed downwardly from its magazine and onto the top of the fed positive plate, a vertically movable platform, means to move the fed negative plate and the separator thereon onto said platform, means to move the said positive plate and the separator thereon onto said platform in a manner such that the lower surface of the positive plate rests upon the separator having its ribs directed upwardly, and control means for repeatedly operating said feeding and moving means in predetermined timed relationship until a predetermined number of plates and separators are disposed upon said platform.

13. An apparatus of the type defined in claim 12 and in which said control means includes means to effect substantially simultaneous feeding of plates and separators from the said magazines until a predetermined number thereof have been disposed on said platform and to thereafter effect feeding of a single negative plate only and movement thereof to said platform, whereby a battery element with negative plates on the top and bottom thereof is assembled on said platform.

14. An apparatus for assembling storage battery elements from battery plates and plate separators comprising a single non-rotatable vertically movable platform, separate magazines disposed at one side of said platform and adapted to respectively contain supplies of negative battery plates and plate separators, separate magazines disposed on another side of said platform and adapted to respectively contain supplies of positive battery plates and plate separators, means to feed a predetermined number of said plates and separators one at a time from said magazines and to stack all of the fed plates and separators upon said platform in predetermined order including a separate reciprocating member operatively associated with each of said magazines, fluid pressure actuated means connected with said members for effecting operation thereof, means to vertically move said platform in timed relationship with the stacking of plates and separators thereon, and means for supplying fluid pressure to said actuating means in predetermined timed relationship.

15. An apparatus for assembling storage battery elements from battery plates and plate separators, comprising a single non-rotatable vertically movable platform, separate magazines disposed at one side of said platform and adapted to respectively contain supplies of negative battery plates and plate separators, separate magazines disposed at another side of said platform and adapted to respectively contain supplies of positive battery plates and plate separators, means to feed a predetermined number of said plates and separators one at a time from said magazines and to stack all of the fed plates and separators upon said platform in the predetermined order which they occupy in a completed battery element including a separate reciprocating member operatively associated with each of said magazines, fluid pressure actuated means connected with said members for effecting operation thereof, means to vertically move said platform in timed relationship with the stacking of the plates and separators thereon, means to remove the stacked plates and separators as a unit from said platform after the said predetermined number have been stacked thereon, and control means for automatically supplying fluid pressure to said actuating means and effecting operation of said removing means in a predetermined order.

ALFRED R. WILLARD.
CARL R. GLASENER.
FRED C. HAAK, JR.
CHARLES A. YOUNG.

References Cited in the file of this patent

UNITED STATES PATENTS

| Number | Name | Date |
|---|---|---|
| 1,514,929 | Ray | Nov. 11, 1924 |
| 1,564,843 | Fulton | Dec. 8, 1925 |
| 2,072,667 | Coe | Mar. 2, 1937 |
| 2,260,540 | Schramm | Oct. 28, 1941 |
| 2,324,523 | Lund | July 20, 1943 |
| 2,427,839 | Davidson | Sept. 23, 1947 |
| 2,509,467 | Anderson | May 30, 1950 |
| 2,591,259 | Hess | Apr. 1, 1952 |